(12) United States Patent
Hilton et al.

(10) Patent No.: US 7,613,765 B1
(45) Date of Patent: Nov. 3, 2009

(54) BUS ARCHITECTURE FOR QUANTUM PROCESSING

(75) Inventors: Jeremy P. Hilton, Vancouver (CA); Yutian Ling, Burnaby (CA)

(73) Assignee: D-Wave Systems, Inc., Burnaby (CA)

( * ) Notice: Subject to any disclaimer, the term of this patent is extended or adjusted under 35 U.S.C. 154(b) by 1023 days.

(21) Appl. No.: 11/089,653

(22) Filed: Mar. 25, 2005

Related U.S. Application Data

(60) Provisional application No. 60/556,778, filed on Mar. 26, 2004.

(51) Int. Cl.
*G06G 7/00* (2006.01)
(52) U.S. Cl. ..................................... 708/801
(58) Field of Classification Search .................. 708/801
See application file for complete search history.

(56) References Cited

U.S. PATENT DOCUMENTS

| 4,370,359 | A  | 1/1983  | Fetter et al. |
| 6,838,694 | B2 | 1/2005  | Esteve et al. |
| 2004/0077503 | A1 | 4/2004  | Blais et al. |
| 2004/0238813 | A1 | 12/2004 | Lidar et al. |
| 2005/0082519 | A1 | 4/2005  | Amin et al. |

OTHER PUBLICATIONS

U.S. Appl. No. 60/556,778, Hilton.
Al-Saidi, W.A., D. Stroud, 2002, "Several small Josephson junctions in a resonant cavity: Deviation from the Dicke model," Phys. Rev. B 65, 224512.
Averin, D.V., C. Bruder, 2003, "Variable Electrostatic Transformer: Controllable Coupling of Two Charge Qubits," Phys. Rev. Lett. 91, 57003.
Barenco, A., C.H. Bennett, R. Cleve, D.P. DiVincenzo, N. Margolus, P. Shor, T. Sleator, J.A. Smolin, H. Weinfurter, 1995, "Elementary gates for quantum computation," Phys. Rev. A 52, pp. 3457-3467.
Berkley, A.J., H. Xu, R.C. Ramos, M.A. Gubrud, F.W. Strauch, P.R. Johnson, J.R. Anderson, A.J. Dragt, C.J. Lobb, F.C. Wellstood, 2003, "Entangled Macroscopic Quantum States in Two Superconducting Qubits," Science 300, 1548.
Blais, A., A.M. Zagoskin, 2000, "Operation of universal gates in a solid-state quantum computer based on clean Josephson junctions between *d*-wave superconductors," Phys. Rev. A 61, 042308.
Born, D., T. Wagner, W. Krech, U. Hübner, L. Fritzsch, 2001, "Fabrication of Ultrasmall Tunnel Junctions by Electron Beam Direct-Writing," IEEE Trans. Appl. Supercond. 11, 373.
Buisson, O., F.W.J. Hekking, 2000, "Entangled states in a Josephson charge qubit coupled to a superconducting resonator," arXiv.org:cond-mat/0008275.

(Continued)

*Primary Examiner*—Tan V Mai
(74) *Attorney, Agent, or Firm*—Seed IP Law Group PLLC

(57) ABSTRACT

A quantum processing apparatus includes a qubit, a superconducting bus, and a controllable coupling mechanism that controllably couples the superconducting bus to the qubit. The controllable coupling mechanism is characterized by a first state in which the superconducting bus and the qubit are capacitively coupled, thereby permitting a coupling operation to be performed between a quantum device, coupled to the superconducting bus, and the qubit. The controllable coupling mechanism is also characterized by a second state in which the superconducting bus and the qubit are capacitively uncoupled such that the qubit and the quantum device are not coupled to each other.

14 Claims, 14 Drawing Sheets

OTHER PUBLICATIONS

DiVincenzo, D.P., 2000, "The Physical Implementation of Quantum Computation," Fortschr. Phys. 48, p. 771-783.

Dolan, G.J., 1977, "Offset masks for lift-off photoprocessing," Appl. Phys. Lett. 31, pp. 337-339.

Friedman, J.R., V. Patel, W. Chen, S.K. Tolpygo, J.E. Lukens, 2000, "Quantum superposition of distinct macroscopic states," Nature 406, 43.

Han, S., Y. Yu, X. Chu, S.I. Chu, Z. Wang, 2001, "Time-Resolved Measurement of Dissipation-Induced Decoherence in a Josephson Junction," Science 293, 1457.

Hu, X., R. de Sousa, S. Das Sarma, 2001, "Decoherence and dephasing in spin-based solid state quantum computers," arXiv.org:cond-mat/0108339v2.

Joyez, P., P. Lafarge, A. Filipe, D. Esteve. M.H. Devoret, 1994, "Observation of Parity-Induced Suppression of Josephson Tunneling in the Superconducting Single Electron Transistor," Phys. Rev. Lett. 72, 2458.

Koval, Y., A. Wallraff, M. Fistul, N. Thyssen, H. Kohlstedt, A.V. Ustinov, 1999, "Narrow Long Josephson Junctions," IEEE Trans. Appl. Supercond. 9, 3957.

Leggett, A.J., S. Chakravarty, A.T. Dorsey, M.P.A. Fisher, A. Garg, W. Zwerger, 1987, "Dynamics of the dissipative two-state system," Rev. Mod. Phys. 59, pp. 1-85.

Majer, J.B., 2002, "Superconducting Quantum Circuits," Thesis, Delft University of Technology, pp. 12-13.

Makhlin Y., G. Schön, and A. Shnirman, 2001, "Quantum-State Engineering with Josephson-Junction Devices," Rev. of Mod. Phys. 73, pp. 357-401.

Martinis, J.M., S. Nam, J. Aumentado, C. Urbina, 2002, "Decoherence of a superconducting qubti from bias noise," American Physical Society 2002 Annual meeting preprint.

Mooij, J.E., T.P. Orlando, L. Levitov, L. Tian, C.H. van der Waal, S. Lloyd, 1999, "Josephson Persistent-Current Qubit," Science 285, pp. 1036-1039.

Nakamura, Y., Y.A. Pashkin, J.S. Tsai, 1999, "Coherent control of macroscopic quantum states in a single-Cooper-pair box," Nature 398, 786.

Nielsen, M.A., I.L. Chuang, 2000, *Quantum Computation and Quantum Information*, Cambridge University Press, Cambridge, UK, pp. 188-202.

Orlando, T.P., J.E. Mooij, L. Tian, C.H. van der Waal, L.S. Levitov, S. Lloyd, J.J. Mazo, 1999, "Superconducting persistent-current qubit," Phys. Rev. B 60, 15398.

Paauw, F.G., 2002, "Spectroscopy experiments on two coupled Josephson persistent current qubits," Thesis, Delft University of Technology, pp. 34-36, 58-60.

Pashkin, Y.A., T. Yamamoto, O. Astafiev, Y. Nakamura, D.V. Averin, J.S. Tsai, 2003, "Quantum oscillations in two coupled charge qubits," Nature 421, 823.

Van der Waal, C.H., A.C.J. ter Haar, F.K. Wilhelm, R.N. Schouten, C.J.P.M. Harmans, T.P. Orlando, S. Lloyd, J.E. Mooij, 2000, "Quantum Superposition of Macroscopic Persistent-Current States," Science 290, 773.

Vion, D., A. Aassime, A. Cottet, P. Joyez, H. Pothier, C. Urbina, D. Esteve, M.H. Devoret, 2002, "Manipulating the Quantum State of an Electrical Circuit," Science 296, 886.

Wallraff, A., 2000, "Fluxon Dynamics in Annular Josephson Junctions: Form Relativistic Strings to Quantum Particles," Thesis, Friedrich-Alexander University of Erlangen-Nürnberg, pp. 20-21.

Yamamoto, T., Y.A. Pashkin, O. Astafiev, Y. Nakamura, J.S. Tsai, 2003, "Demonstration of conditional gate operation using superconducting charge qubits," Nature 425, 941.

Zurek, W.H., 1991, "Decoherence and the Transition from Quantum to Classical," Physics Today 44, pp. 36-44.

BUS ARCHITECTURE FOR QUANTUM PROCESSING

CROSS REFERENCE TO RELATED APPLICATIONS

This application claims benefit, under 35 U.S.C. § 119(e), of U.S. Provisional Patent Application No. 60/556,778, filed on Mar. 26, 2004, which is hereby incorporated by reference in its entirety. This application is further related to concurrently filed application Ser. No. 11/089,650, entitled "Methods for Quantum Processing," which is hereby incorporated in its entirety.

1. FIELD OF THE INVENTION

The present invention relates to quantum computing and superconducting devices. More specifically, the present invention relates to performing operations on superconducting qubits.

2. BACKGROUND OF THE INVENTION

Several quantum computing hardware proposals have been made. Of these hardware proposals, the most scalable physical systems appear to be those that are superconducting structures. Superconducting material is material that has no electrical resistance below critical levels of current, magnetic field and temperature. Josephson junctions are examples of such structures.

2.1 Superconducting Qubits

One physical realization of a quantum computer is based on quantum bits, known as "qubits." Generally speaking, a qubit is a well-defined physical structure that (i) has a plurality of quantum states, (ii) can be coherently isolated from its environment, and (iii) permits quantum tunneling between two or more quantum states associated with the qubit. See for example, Mooij et al., 1999, Science 285, p. 1036, which is hereby incorporated by reference. Representative but nonlimiting physical implementations of qubits include ion traps, cavity quantum electrodynamics (QED), nuclear magnetic resonance (NMR) based qubits, neutral atoms in an optical lattice, quantum dots, silicon based qubits, nuclear spin of single donor atoms in silicon (Kane computer), electrons on liquid helium, optical photons, and superconducting Josephson junction devices. A survey of the current physical systems from which qubits can be formed is found in Braunstein and Lo (eds.), 2001, *Scalable Quantum Computers*, Wiley-VCH Verlag GmbH, Berlin, which is hereby incorporated by reference in its entirety. In order for a physical system to support quantum computation, specific requirements must be satisfied:

- the physical system must be scalable and composed of well characterized qubits (scalability requirement);
- an ability to initialize the state of such qubits to a simple fiducial state, such as |000 . . . ⟩;
- long relevant decoherence times for such qubits, much longer than the gate operation time used to manipulate the quantum states of the qubits in order to perform quantum computations;
- a "universal" set of such quantum gates; and
- a qubit-specific measurement capability in order to measure the states of the qubits.

See DiVincenzo in *Scalable Quantum Computers*, chapter 1, Wiley-VCH Verlag GmbH, Berlin, which is hereby incorporated by reference in its entirety. The scalability requirement means that it must be possible to couple a reasonable number of the qubits in a way that prevents the qubits from decohering and thereby losing their quantum nature. Such coupling is referred to in the art as coherent coupling. Associated with scalability is the need to eliminate qubit decoherence.

Also required for a qubit to be useful in quantum computing is the ability to perform operations that initialize, control, and couple the qubit. Control of a qubit includes performing single qubit operations on a single qubit (single qubit gates). Such control further includes performing multi-qubit operations on two or more qubits (multi-qubit gates). This set of operations is typically a universal set. A universal set of quantum operations is any set of quantum operations that permits all possible quantum computations. Many sets of gates (operations) are universal. For example, single qubit and CNOT gates can be used to implement an arbitrary unitary operation on n qubits, and therefore are universal for quantum computation. See Barenco et al., 1995, Phys. Rev. A 52, p. 3457 and Nielsen and Chuang, 2000, *Quantum Computation and Quantum Information*, Cambridge University Press, Cambridge, pp. 188-202, each of which is hereby incorporated by reference in its entirety.

Many qubits include Josephson junctions. There are two principal means to realize superconducting qubits using such Josephson junctions. One means corresponds to the limits of well-defined charge (charge qubit). The other means corresponds to the limits of well-defined phase (phase qubit). Phase and charge are related variables that, according to central quantum principles, are canonical conjugates of one another. In charge qubits, the charging energy of a superconducting island dominates over the Josephson energy ($E_C \gg E_J$) and the relevant quantum degree of freedom is the charge on superconducting islands. As used herein, the symbol $\gg$ means that the physical variable that precedes the $\gg$ symbol, the first physical variable, is so much larger than the physical variable that comes after the $\gg$ symbol, the second physical variable, that the observable range in magnitudes of the second physical variable is negligible relative to the magnitude of the first variable. In flux qubits, the Josephson energy dominates over the charging energy ($E_J \gg E_C$) and the relevant quantum degree of freedom is magnetic flux. The division of the two classes of devices is outlined in Makhlin et al., 2001, Rev. Mod. Phys. 73, pp. 357-491, which is hereby incorporated by reference in its entirety. Superconducting qubits include devices that are well known in the art, such as Josephson junctions. See, for example, Barone and Paternò, 1982, *Physics and Applications of the Josephson Effect*, John Wiley and Sons, New York; Martinis et al., "Rabi oscillations in a large Josephson junction qubit," preprint presented at the American Physical Society (APS) 2002 Annual Meeting, held Jul. 27-31, 2002; and Han et al., 2001, Science, 293, 1457, each of which is hereby incorporated by reference in its entirety.

Materials that exhibit superconducting properties are candidates for quantum computing applications, since the quantum behavior of the Bose condensates (Cooper pairs) at Josephson junctions has macroscopically observable variables. Indeed, several designs of a superconducting qubit have been proposed and tested, such as charge qubits, rf-SQUID, and three-junction flux qubits. See, for example, Nakamura et al., 1999, Nature 398, pp. 786-788; Friedman et al., 2000, Nature 406, pp. 43-46; and van der Wal et al., 2000, Science 290, pp. 773-777, each of which is hereby incorporated by reference in its entirety. The qubits described in these references are not coupled to each other and are not controlled in a scalable manner. Therefore, the qubits described in these references do not satisfy all the requirements for universal quantum computing put forth by DiVincenzo.

2.2 Coherence Requirement

The quantum mechanical properties of a qubit are affected by interactions between the qubit and the environment (e.g., other systems). Yet quantum computation requires that the qubits that make up the physical quantum computation system be isolated from such interactions so that the state of the qubits can coherently evolve in accordance with quantum gates that are applied to the qubits. Despite the requirement for isolation so that qubits can evolve, universal quantum computing still requires some control over (interaction with) the qubits so that fundamental operations such as qubit initialization, gate application, and qubit state measurement can be effected. This apparent contradiction between the need for isolation and the need for control over the qubits is a direct result of the quantum behavior of qubits.

The need for isolated qubits that nevertheless can be controlled has presented fabrication and design challenges including identification of methods for initialization, control, coupling and measurement of qubits. Systems and methods for addressing these challenges are being investigated. For instance, systems in which qubits can be controlled and measured in ways that do not perturb their internal quantum states are being sought. Devices that include multiple controllable qubits that permit classical logic operations to be performed are central to the goal of building a quantum computer. To date, many known systems and methods for coupling model qubits in simulated quantum computing devices have been unwieldy and generally unsatisfactory. Such systems and methods are based on optics (entanglement of photons) or nuclear magnetic resonance (utilizing spin states of atoms and molecules).

Recently, however, inductive coupling between phase qubits has been described in, for example, Orlando et al., 1999, "Superconducting Persistent Current Qubit," Phys. Rev. B 60, p. 15398; and Makhlin et al., 2001, "Quantum-State Engineering with Josephson-Junction Devices," Rev. Mod. Phys. 73, pp. 357400, in particular, page 369, each of which is hereby incorporated by reference in its entirety. However, the qubits described in Orlando et al. and Makhlin et al. have the drawback that they have not been coupled and controlled in a scalable manner.

2.3 Gate Operations

As discussed above, in order to effect quantum computing, a physical system containing a collection of qubits is needed. A qubit, as defined herein, is a quantum two-level system analogous to the ground and first excited state of an atom. The first state of a qubit is denoted as $|0\rangle$ and the second state is denoted as $|1\rangle$. A feature that distinguishes a qubit from a bit is that, according to the laws of quantum mechanics, the permitted states of a single qubit fills up a two-dimensional complex vector space; the general notation is written $a|0\rangle + b|1\rangle$, where a and b are complex numbers. The general state of two qubits, $a|00\rangle + b|01\rangle + c|10\rangle + d|11\rangle$ is a four-dimensional state vector, one dimension for each distinguishable state of the two qubit system. When a two-qubit gate operation has been performed between the two qubits, their states can be entangled during the evolution of that gate. This means that the state of the two qubits cannot be expressed as a product of the states of two individual qubits. The general state of n entangled qubits is therefore specified by a $2^n$-dimensional complex state vector. The creation of $2^n$-dimensional complex vectors provides a basis for the computing potential of quantum computers. For more information on qubits and gate operations, see Braunstein and Lo (eds.), 2001, *Scalable Quantum Computers*, Wiley-VCH, New York, which is hereby incorporated by reference in its entirety.

In standard model quantum computation, also known as circuit model quantum computation, quantum gate operations are performed on the qubits in the time domain. Gates are represented by matrices that are matrix multiplied with the qubit's state vector. The elementary single-qubit gates are:

$$X = \begin{bmatrix} 0 & 1 \\ 1 & 0 \end{bmatrix}, \quad Y = \begin{bmatrix} 0 & -i \\ i & 0 \end{bmatrix}, \text{ and } Z = \begin{bmatrix} 1 & 0 \\ 0 & -1 \end{bmatrix}.$$

Other single-qubit gates include, but are not limited to:

$$H = \frac{1}{\sqrt{2}} \begin{bmatrix} 1 & 1 \\ 1 & -1 \end{bmatrix}, \quad S = \begin{bmatrix} 1 & 0 \\ 0 & i \end{bmatrix}, \text{ and } T = \begin{bmatrix} 1 & 0 \\ 0 & e^{i\pi/8} \end{bmatrix}.$$

There are also two-qubit quantum gate operations, which are performed between two qubits. These two-qubit gates are represented by 4×4 matrices. Examples of two-qubit gates are CNOT, SWAP, and $\sqrt{SWAP}$. Certain combinations of one- and two-qubit gates are all that are necessary to construct a universal set of gates for quantum computing. An example of such a universal set is X, Z, and CNOT. Another example of a universal set is X, Y, and $\sqrt{SWAP}$. These gates alone are said to be universal for quantum computation, and can thus implement any unitary operation on n qubits. These groupings of gates are said to be universal because the single qubit gates can generate the SU(2) group, while the two-qubit gate can generate the $SU(2^N)$ group. SU(2) describes the states of a single qubit. See, for example, U.S. Patent Application Publication No. 2004/238813 A1, entitled, "Dressed Qubits," which is hereby incorporated by reference in its entirety.

To make a practical design for a quantum computer, one decomposes any valid quantum computation into a sequence of elementary one- and two-qubit quantum gates that can be realized in physical hardware that is feasible to fabricate. The set of these one- and two-qubit gates is arbitrary provided it is universal, e.g., capable of achieving any valid quantum computation from a quantum circuit comprising only gates from this set. A widely accepted method of operating quantum computers is the "standard paradigm" of universal quantum computation. According to the standard paradigm, all operations necessary for a quantum computer can be performed by appropriate application of a set of single qubit gates and one two-qubit gate because these operations generate the full special unitary 2 group, denoted $SU(2^N)$, and span the space necessary for quantum computation.

A group G, such as the $SU(2^N)$ group, is a finite or infinite set of elements together with a binary operation that together satisfy the four fundamental properties of closure, associativity, the identity property, and the inverse property. The operation with respect to which a group is defined is often called the "group operation," and a set is said to be a group "under" this operation. In other words, elements A, B, C, ... of set S, with binary operation between A and B, denoted AB, form a group G when they have the following properties:

(i) closure: if A and B are two elements in S, then the product AB is also in S;

(ii) associatively: the defined multiplication is associative, e.g., for all A, B, C∈S, (AB)C=A(BC);

(iii) identity: there is an identity element I (a.k.a., 1, E, or e) such that IA=AI=A for every element A∈S; and (iv) inverse: there is an inverse or reciprocal of each element. Therefore, the set S contains an element $B=A^{-1}$ such that $AA^{-1}=A^{-1}A=I$ for each element of S.

The $\text{SU}(2^N)$ group satisfies these conditions. The $\text{SU}(2^N)$ group is a subset of unitary 2. Unitary 2 is a group where the objects are 2 by 2 matrices that are unitary, e.g., UU†=1, and the operation is matrix multiplication. $\text{SU}(2^N)$ has the general group element $$U = \begin{pmatrix} a & b \\ -b^* & a^* \end{pmatrix}$$

with $a \times a^* + b \times b^* = 1$ and where a and b are complex. For more information on special unitary groups, see Arfken, 1985, *Mathematical Methods for Physicists*, Third Edition, Academic Press, Inc., San Francisco, which is hereby incorporated by reference in its entirety.

Quantum computers that generate the full $\text{SU}(2^N)$ group space for N qubits are sometimes referred to as universal quantum computers. In particular, two single qubit gates that are based on two non-commutating Hermitian operators can generate all one-qubit quantum gates. Two qubit gates can entangle the states of two qubit quantum systems.

A common example of a two-qubit gate is the controlled NOT (CNOT) gate. The CNOT gate has two input qubits, known as the control qubit and the target qubit, respectively. In a CNOT gate, if the control qubit is set to 0, then the target qubit is left alone. If the control qubit is set to 1, then the target qubit is flipped. However, any classical (e.g. AND) or quantum (e.g. $\sigma_z \otimes \sigma_z$) two qubit logic gate classical (e.g. AND) or quantum (e.g. $\sigma_z \otimes \sigma_z$) can be used. Alternatively, one can use a discrete set of single qubit operations that can approximate, to arbitrary accuracy, any quantum gate. An example of a discrete set of logic gates is, HADAMARD, PHASE (or S), π/8 (or T), and an entangling gate such as CNOT. See Nielsen and Chuang, 2000, *Quantum Computation and Information Processing*, Cambridge University Press, which is hereby incorporated by reference in its entirety.

A CNOT gate is composed of an elementary two-qubit gate operation such as $\sigma_z \otimes \sigma_z$ and some other single qubit operations. Operators X, Z, and $\sigma_z \otimes \sigma_z$ correspond to the elementary set of gates of many solid-state designs and can be implemented in NMR-based quantum computers. See Gershenfeld and Chuang, 1997, Science 275, p. 351, which is hereby incorporated by reference in its entirety. Implementation of Operators X, Z, and $\sigma_z \otimes \sigma_z$ in a quantum register is described in Zagoskin and Blais, 2000, Phys. Rev. A 61, 042308, which is hereby incorporated by reference in its entirety.

Another elementary two-qubit operation is $\sigma_x \otimes \sigma_x$. Normally a system has only one natural interaction, $\sigma_z \otimes \sigma_z$ or $\sigma_x \otimes \sigma_x$, which is the elementary quantum gate that acts on two qubits whenever two qubits are coupled, in a given system. This elementary gate operation is then used, in combination with elementary single-qubit gate operations, to form two-qubit gates such as CNOT, SWAP, etc. As indicated above, two elementary two-qubit gate operations are:

$$\sigma_z \otimes \sigma_z = \begin{bmatrix} 1 & 0 & 0 & 0 \\ 0 & -1 & 0 & 0 \\ 0 & 0 & -1 & 0 \\ 0 & 0 & 0 & 1 \end{bmatrix}, \quad \sigma_x \otimes \sigma_x = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

Performing a coupling operation between qubits comprises performing an elementary two-qubit gate operation, such as $\sigma_z \otimes \sigma_z$ or $\sigma_x \otimes \sigma_x$, on two qubits.

In some instances, elementary gate operations acting on one or more qubits will leave the qubits entangled, or unentangled following the operation. In some instances, an elementary gate operation causes the qubits on which the gate was applied to become unentangled.

Current methods for performing two qubit gate operations on qubits in order to perform quantum computing are susceptible to loss of coherence. Loss of coherence can be viewed as the loss of the phases of quantum superpositions in a qubit as a result of interactions with the environment. Loss of coherence results in the loss of the superposition of states in a qubit. See, for example, Zurek, 1991, Phys. Today 44, pp. 36-44; Leggett et al., 1987, Rev. Mod. Phys. 59, pp. 1-85; Weiss, 1999, Quantitative Dissipative Systems, $2^{nd}$ ed., World Scientific, Singapore; and Hu et al.; arXiv.org: cond-mat/0108339v2, each of which is hereby incorporated by reference in its entirety.

2.4 Use of a Resonant Controlled Qubit System (RCQS) to Enable Two-Qubit Coupling Operations It has been proposed in the art that a superconducting resonator can be coupled with a qubit when the resonant frequency of the superconducting resonator is correlated with the energy difference between the basis states of the qubit. Once coupled, coupling operations can be performed. See, for example, Buisson and Hekking, Aug. 18, 2000, "Entangled states in a Josephson charge qubit coupled to a superconducting resonator," arXiv.org: cond-mat/0008275v1; and Al-Saidi and Stroud, Dec. 4, 2001, "Eigenstates of a small Josephson junction coupled to a resonant cavity," Phys. Rev. B 65, 014512, which are hereby incorporated by reference in their entireties. The entanglement proposed in these references causes the state of the charge qubit to be entangled with the state of the superconducting resonator, thus illustrating the potential for achieving entangled quantum states in a solid state design. However, the references do not provide methods for coherently performing coupling operations on qubits in a solid-state design, nor do they demonstrate how such coupling can be used to facilitate quantum computing.

The quantum computing systems and methods described in U.S. patent application Ser. No. 10/419,024, filed May 17, 2003, entitled "Resonant Controlled Qubit System," as well as in U.S. patent application Ser. Nos. 10/798,737, 10/801, 335, and 10/801,340, which are hereby incorporated by reference in their entireties, overcome some of the limitations of Buisson and Hekking as well as Al-Saidi and Stroud. These patent applications describe systems and methods for coupling qubits together in a manner that overcomes the requirements of direct coupling and furthermore realize a bus system for coupling non-adjacent qubits together. FIG. 1 illustrates such a system 700. In system 700, bus 990 is capacitively coupled to respective qubits 610 by respective capacitors 611-E. Each qubit 610 is a superconducting quantronium qubit having a mesoscopic island region 670 separated from leads by Josephson junctions 615 and capacitors 611. Charge devices 662 are used to maintain the potential energy profile of a corresponding quantronium qubit 610 in a regime that can be used for quantum computation. The quantum energy state of each quantronium qubit 610 is determined (read out) by a corresponding readout device 650.

A microwave signal with the appropriate frequency can cause transitions between the basis states of qubits 610, hence providing manipulation of the qubit state. See Vion et al., 2002, Science 296, pp. 886-889, hereinafter referred to as Vion et al., which is hereby incorporated by reference in its entirety. In FIG. 1, the microwave signal is applied by corresponding A/C voltage sources 661, which emit one or more frequencies in the microwave range. Qubits 610-1 through 610-N are electrically coupled to bus 990 in such a manner that resonant control system 920, which is coupled to (in electrical communication with) the qubits through bus 990, can be used to mediate coupling operations between qubits 610. As illustrated in FIG. 1, resonant control system 920 includes current source 921-1, Josephson junction 921-2, shunt capacitance 921-3, and ground $930_q$, There is a limit to how many qubits 610 can be capacitively or inductively connected to bus 990 in the configuration illustrated in FIG. 1. To address this limitation, U.S. patent application Ser. No. 10/419,024, filed May 17, 2003, entitled "Resonant Controlled Qubit System," referred to hereinafter as Blais et al and which is hereby incorporated by reference in its entirety, proposed dividing bus 990 into sections using switches and, optionally, pivot qubits as illustrated in quantum register 800 (FIG. 2A). Quantum register 800 includes a plurality of qubits 610 and a plurality of resonant control systems 920. Qubits 610 in quantum register 800 are separated into groups 802. Each group 802 of qubits is associated with a respective resonant control system 920. Each group 802 of qubits is connected to a switch 991 that typically is in an open state, thereby isolating the qubits of one group 802 from other groups 802 linked to bus 990. In some instances, switches 991 are superconducting single electron transistors (SSETs). The characteristics of SSETs are known and are described, for example, in Joyez et al., 1994, Phys. Rev. Lett. 72, pp. 2458-2461, which is hereby incorporated by reference in its entirety. Fabrication of SSETs is known in the art. For example, see Born et al., 2001, IEEE Trans. Appl. Superconductivity 11, pp. 373-376, which is hereby incorporated by reference in its entirety. As illustrated in FIG. 2A, a pivot qubit 610-P is placed in regions 990-P that interface respective qubit groups 802. Pivot qubits 610-P facilitate interaction between qubits in different qubit groups 802. In FIG. 2A, each qubit 610 is respectively associated with a device 660. Each respective device 660 is a mechanism for controlling the quantum state of the corresponding qubit 610.

Blais et al. provides methods for performing a coupling operation between a first qubit 610 in a first qubit group 802 and a second qubit 610 in a second qubit group 802. In step 1000 of a method disclosed in Blais et al., a first qubit 610 in a first group 802 is coupled to a first resonant control system 920 by biasing system 920 to a frequency $\omega_{12}$ that represents the energy differential between a first quantum energy level and a second quantum energy level (e.g., the lowest two quantum energy levels) of the first qubit 610. During step 1000, the first qubit group 802 is isolated from other qubit groups 802 by opening all switches 991 that connect the first qubit group 802 to other qubit groups 802. In step 1000, the first resonant control system 920 is tuned to a frequency $\omega_{12}$ for a time that is sufficiently long enough to perform a coupling operation between the first resonant control system 920 and the first qubit 610.

In step 1002 of the method, a first switch 991 between the first qubit group 802 and a region 990-P that adjoins the second qubit group 802 is closed so that first resonant control system 920 will couple to a first pivot qubit 610-P. To achieve this coupling, the first resonant control system 920 is biased to a frequency $\omega_P$ that represents the energy differential between a first quantum energy level and a second quantum energy level (e.g., the lowest two quantum energy levels) of first pivot qubit 610-P so that the quantum state of first resonant control system 920 couples with the quantum state of first pivot qubit 610-P. During step 1002, a second switch 991 that electrically connects first pivot qubit 610-P to a second qubit group 802 is in an open state, thereby isolating the first pivot qubit 610-p from a second resonant control system 920. Next, first switch 991 is opened, thereby isolating the first pivot qubit 610-P from the first qubit group 802.

In step 1004, second switch 991 (e.g., 991-2) is closed. This allows pivot qubit 610-P to couple with the second resonant control system 920 (e.g., 920-2). To achieve this coupling, second resonant control system 920 is biased to a frequency $\omega_P$ that represents the energy differential between a first quantum energy level and a second quantum energy level (e.g., the lowest two quantum energy levels) of pivot qubit 610-P (e.g., 610-P-i), thereby coupling pivot qubit 610-P and second resonant control system 920. In step 1006, the second switch 991 is opened, thereby isolating the second qubit group 802 from the first pivot qubit 610-P.

In step 1008, the second resonant control system 920 (e.g., 920-2) is coupled to a desired second qubit 610 (e.g., 610-3). This is accomplished by tuning the second resonant control system 920 to a frequency $\omega_{34}$ for some time period $t_{1008}$. The frequency $\omega_{34}$ represents the energy differential between a first quantum energy level and a second quantum energy level of the second qubit (e.g., the lowest two quantum energy levels) of the desired second qubit 610 so that the quantum state of the second resonant control system 920 is coupled to the desired second qubit 610. If the desired second qubit 610 is not found in the second group 802, then steps 1002 through 1006 can be repeated using one or more additional pivot groups 610 until the desired qubit group 802 is reached. Typically, the respective energy differentials between the lowest two quantum energy levels of each qubit 610 in a given group 802 are unique. Furthermore, the energy differential between the lowest two quantum energy levels of a pivot qubit should be different than the respective energy differential between the lowest two quantum energy levels of each qubit in each group 802 that the pivot qubit 610 is capable of electrically communicating with through a switch 991.

2.5 Limits to the Number of Qubits that can be Connected to a Bus

One consideration when designing a quantum computer is the provision of a circuit architecture that will scale to larger numbers of qubits, beyond the one or two qubit schemes typically found in the known art. Section 2.4 described a promising resonant controlled qubit system (RCQS) for performing coupling operations between qubits connected to a bus. However, an important aspect of the RCQS is that, although the qubits are controllably coupled, the number of qubits connected to each bus segment is limited in part by the effective bus capacitance, which grows in proportion with the number of qubits connected to each bus segment. As the capacitance of the bus increases, coupling operations become more difficult to perform in a short enough period of time. This growth in capacitance is understood when it is appreciated that each qubit or resonator attached to the bus in the RCQS is attached to ground as illustrated in FIG. 2B, meaning that all the devices are in parallel. Thus, the capacitance $C_{bus\ segment}$ of a bus segment 990 is determined by adding up the capacitances of each qubit and resonator attached to the bus segment:

$$C_{bus\ segment} = C_{qubit1} + C_{qubit2} + \ldots + C_{qubitN} + C_{resonator} \quad (1)$$

The capacitance of each additional qubit added to a given bus segment in the RCQS causes that overall capacitance of the bus segment to reach a capacitance threshold that will no longer support quantum computing operations. For exemplary devices, $C_{resonator}$=5.8 pF, and $C_{qubit}$=5.5 fF. Qubits can be added to the bus, so long as the total sum of the qubit capacitances does not approach $C_{resonator}$. In some embodiments, 10-100 qubits can be added to bus 990 before the sum of the qubit capacitances approaches the capacitance of the resonator and adversely affects the operation of the bus.

As the number of qubits added to the bus increases, another factor begins to limit the total number of qubits that can be coupled to the bus. This factor is a leakage of the quantum state of the bus to higher bus states as more qubits are added. In other words, as more qubits are added to the bus, the total Hilbert space becomes proportionally larger, leaving more room for leakage. Thus, operations must be run at a slower rate to avoid spurious transitions when the number of qubits coupled to the bus increases in order to avoid such leakage. This is disadvantageous because all qubits, regardless of design, have a finite coherence length. Therefore, what is desired in the art are quantum computing architectures that can perform quantum computing operations quickly before the qubits in the architecture decohere.

The RCQS design also has the drawback that it requires that each of the qubits have different energy level spacings (between the information basis states). Further still, as discussed in Section 2.4, the method of coupling qubits involves a sequence of tuning steps where the energy level spacing of the respective qubits is tuned to a predetermined value to match the target qubit and hence realize the desired coupling operation. To avoid tuning the qubits themselves and hence increasing their decoherence, the RCQS introduces a tunable bus to mediate the coupling operations between qubits. Another limitation of the bus size in the RCQS arises due to variance in the relative energy level spacing of the qubits. Although each type of qubit can have a different energy level spacing between a first energy state and a second energy state, from about 800 megahertz (MHz) to about 100 gigahertz (GHz), the possible values for a given type of qubit fall within a relatively small range, for example, a few GHz. If any two or more qubits within a bus segment have similar energy level spacings, then the method will require tuning one of the qubits away from their operating point, hence increasing susceptibility to noise for the respective qubits.

Thus, although the segment and pivot architecture illustrated in FIG. 2 and as proposed in the RCQS (Blais et al.) represents a significant advancement over previous multi-qubit coupling proposals, the number of qubits connected to each segment of the RCQS is potentially limited. Since each pivot operation introduces overhead in the number of operations required to couple two qubits together, there is a need to increase the number of qubits in each segment without compromising the functionality of the bus architecture.

3. SUMMARY OF THE INVENTION

The present invention allows a plurality of qubits to be connected to a superconducting bus in a controllable fashion. Because the connection is controllable, each respective qubit in the plurality of qubits contributes no capacitance or very little capacitance to the bus when the quantum state of the qubit is not coupled to the superconducting bus. In this way, more qubits can be attached to the superconducting bus without increasing the overall capacitance of the bus beyond a threshold capacitance that no longer supports coherent quantum computation in a reasonable time frame. Also, the qubits are free to have the same energy-level spacing, as the coupling is controlled not by tuning the energy level spacing in the qubits or in a resonator but by tuning controllable coupling elements. This provides the additional benefit of reducing the complexity, and therefore cost, of the inventive quantum architectures relative to known quantum systems.

One particular embodiment of the present invention comprises a bus architecture, capable of interfacing with superconducting qubits and scaling to large numbers of qubits, to create an integrated circuit quantum processor. The superconducting bus is controllably coupled to each superconducting qubit and is capable of supporting a quantum state and mediating quantum operations. In some embodiments of the present invention, a mechanism for controllable coupling is used to coherently couple a qubit to a superconducting bus so that the qubit-bus capacitance is zero or nearly zero when the mechanism for controllable coupling is uncoupled. This permits a one-dimensional, two-dimensional, or three-dimensional array of qubits to be formed using a single bus without deterioration of the operation of the bus due to excessive bus capacitance.

In some embodiments of the present invention, a superconducting bus architecture is grouped into bus segments. Each bus segment is connected by a pivot segment. Each such pivot segment has a mechanism for controllably coupling the pivot segment to one or more bus segments in the bus architecture. In some embodiments, the mechanism for controllable coupling comprises a tunable capacitance, such that the capacitance is tuned to zero or nearly zero when the pivot segment is disconnected from the respective bus segment. Thus, in some embodiments where the bus is organized into bus segments, each such bus segment includes a plurality of qubits and is separated from adjacent bus segments by one or more pivot segments.

In accordance with an embodiment of the present invention, an architecture comprising a first qubit and a second qubit, capable of interacting with each other in a coupling operation, has a mechanism for controllably coupling the first qubit or the second qubit to a superconducting bus. This mechanism for controllably coupling a corresponding qubit to the superconducting bus has a coupled state in which a coupling operation between the corresponding qubit and the superconducting bus is possible, and an uncoupled state, in which the corresponding qubit does not capacitively affect the superconducting bus. In an embodiment of the present invention, a method for performing a coupling operation between a first qubit and a second qubit in a quantum register, in which one or both of the first qubit and the second qubit is connected to a superconducting bus through a corresponding mechanism for controllable coupling, comprises selecting the first and second qubits by tuning the mechanism for controllable coupling to a coupled state. In some embodiments, the first qubit has a mechanism for controllable coupling and the second qubit has a direct connection to the bus.

Some embodiments of the present invention provide a method for performing a quantum operation comprising (i) coupling a qubit and a superconducting bus to each other, (ii) tuning a characteristic of the superconducting bus for a first period of time, and (iii) uncoupling the qubit and the superconducting bus from each other. In some embodiments of the present invention, the tuning comprises tuning a quantum device that is coupled to the superconducting bus. In some embodiments, the characteristic is an energy level spacing in a quantum device. In some embodiments of the present invention, the tuning further comprises setting either a gate voltage directly applied to a quantum device attached to the bus, in the case of a phase-charge qubit for example, or a bias current directly applied to the quantum device attached to the bus, in the case of a current biased Josephson junction for example.

One embodiment of the present invention is a quantum processing apparatus comprising a superconducting qubit, a superconducting bus, a quantum device coupled to the superconducting bus, and a controllable coupling mechanism that controllably couples the superconducting bus to the superconducting qubit. The controllable coupling mechanism is capable of being in any one of a plurality of states at any given time, these plurality of states include a first state in which the superconducting bus and the superconducting qubit are capacitively coupled and a second state in which the superconducting bus and the superconducting qubit are capacitively uncoupled.

Another embodiment of the present invention comprises a bus architecture for quantum processing, comprising a plurality of bus segments, a plurality of qubit sets, a plurality of pivot segments and a plurality of controllable coupling mechanisms. Each qubit set in the plurality of qubit sets comprises a plurality of qubits. Each pivot segment in the plurality of pivot segments controllably couples a different first bus segment and second bus segment in the plurality of bus segments to each other. Each respective controllable coupling mechanism in the plurality of controllable coupling mechanisms controllably couples a corresponding qubit in a qubit set to a bus segment in the plurality of bus segments such that each qubit in each qubit set in the plurality of qubit sets is controllably coupled to at least one bus segment. Each respective controllable coupling mechanism in the plurality of controllable coupling mechanisms includes a coupled state, wherein a controllable coupling operation between a bus segment in the plurality of bus segments and a qubit corresponding to the respective controllable coupling mechanism is possible, and an uncoupled state, wherein the qubit does not capacitively affect the bus segment.

4. BRIEF DESCRIPTION OF THE DRAWINGS

5. DETAILED DESCRIPTION

Figure 1:
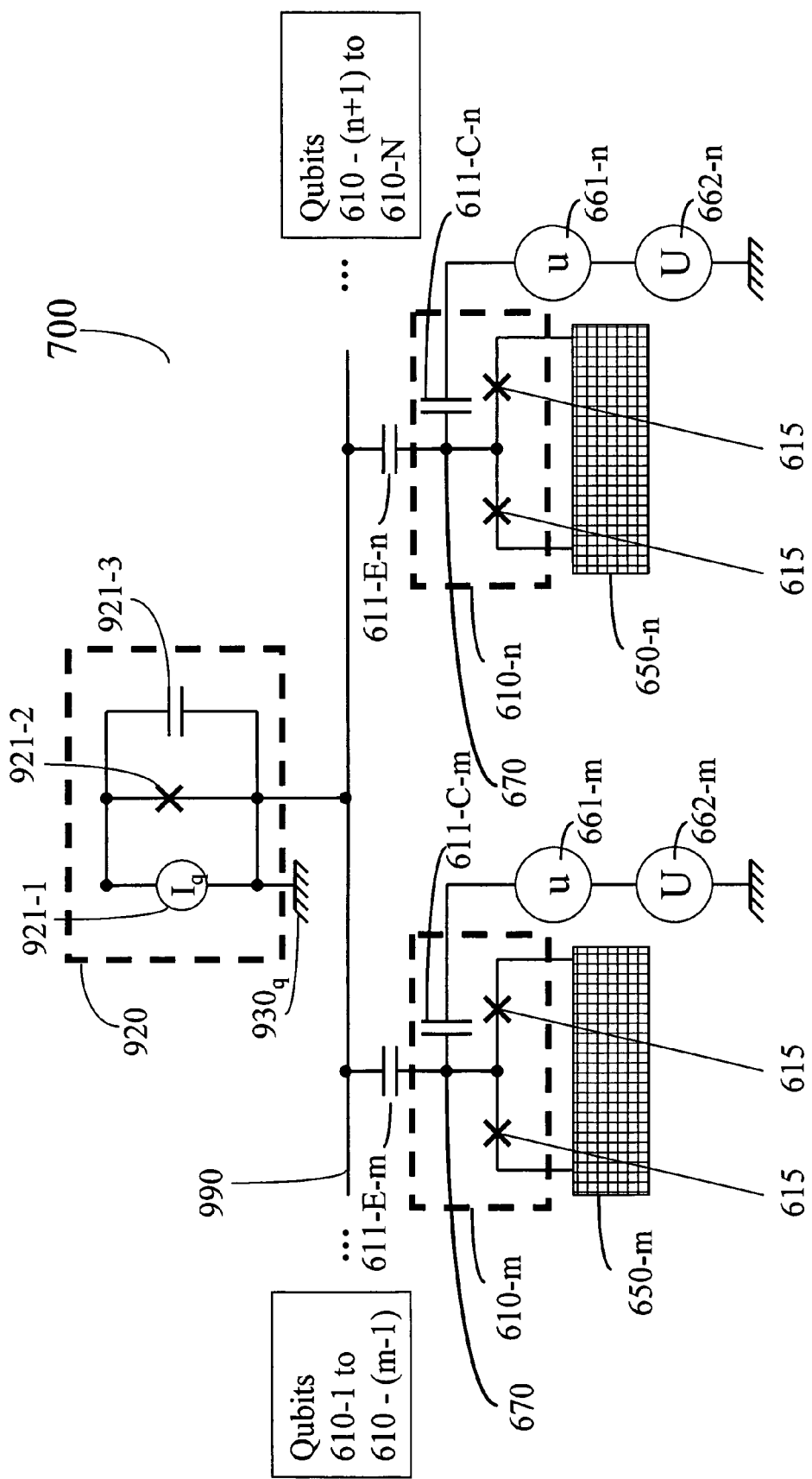
FIG. 1 illustrates a known bus architecture in accordance with the prior art.

In accordance with the present invention, a scalable superconducting bus architecture for quantum processing comprises a plurality of qubits, where all or a portion of the plurality of qubits are controllably coupled to the bus. The size of the superconducting bus is limited only by its effective capacitance and the coherence length of the material used to make the bus. This novel architecture provides three advantages over the prior art. First, the effective-capacitance of the superconducting bus does not significantly depend on the number of qubits that are coupled to the bus. Thus, the number of qubits that can be coupled with the bus in the present invention is greater than that found in prior art systems. Second, there is no limitation to the energy level spacing spectrum of the qubits as is the case for the resonant controlled qubit system (RCQS) described in Section 2.4 above, because the qubits can be controllably uncoupled from the superconducting bus in a reversible, controllable fashion. When a qubit is controllably uncoupled from the bus, it does not substantially contribute to the effective capacitance of the bus. Third, the energy spacing of the relevant energy levels of each of the qubits controllably coupled to the superconducting bus can be similar or identical, thereby simplifying the quantum architecture and making it cheaper to build.

In accordance with the present invention, when a qubit is coupled to a superconducting bus, it is possible to controllably perform a coupling operation on the qubit and bus by controlling the characteristics of the bus or the qubit, or both. The characteristics of the qubit can comprise the energy-level spacing between the two lowest energy levels of the qubit, or the coupling strength between the qubit and the bus. The characteristics of the bus can comprise the energy-level spacing between the two lowest energy levels in a quantum device connected to the bus, the coupling strength between the qubit and the bus, or the state of a controllable coupling device connected to the bus and qubit. Furthermore, when a qubit is uncoupled from a bus, the qubit and bus do not interact, although in some embodiments their states may remain entangled, and the characteristics (e.g., effective capacitance) of the bus are not substantially affected by the qubit.

5.1 Single Bus Architectures

One aspect of the present invention provides a novel bus architecture for quantum processing. The architecture comprises a superconducting bus and a plurality of qubits coupled to the bus. All or a portion of the qubits in the plurality of qubits are each respectively associated with a qubit controller that can be used to implement single qubit operations. The architecture makes use of controllable coupling mechanisms to couple all or a portion of the qubits in the plurality of qubits to the bus. Each such controllable coupling mechanism is characterized by (i) a first (coupled) state that allows the qubit connected to the coupling mechanism to interact with the bus, thus allowing coupling operations to be performed on the qubit and bus, and (ii) a second (uncoupled) state in which the qubit is uncoupled from the bus. In the first (coupled) state, the bus is capable of interacting with the quantum state of the qubit as well as mediating coupling operations between the associated qubit and any other qubit coupled to the bus. In the second (uncoupled) state, the associated qubit cannot interact with the bus or any other qubits that are coupled to the bus. Only qubits that are coupled to a bus through a controllable coupling mechanism that is in a first (coupled) state (and optional qubits that are directly capacitively coupled to the bus as described in Section 2.4) contribute to the effective capacitance of the bus. Qubits that are coupled to the bus through a controllable coupling mechanism in the second (uncoupled) state contribute zero or less than 1 attofarad to the effective capacitance of the superconducting bus. In some embodiments, the bus is fabricated from a conventional superconducting material. Exemplary conventional superconducting materials include, but are not limited to, aluminum, niobium, and lead. The buses are referred to herein as superconducting because they are fabricated from materials that, under certain conditions, can exist in a superconducting state. Such buses are still referred to as superconducting herein even when they are not in their superconducting state. However, it will be appreciated that quantum computation using the inventive architecture can only take place when the superconducting bus is, in fact, in a superconducting state.

A direct capacitive coupling between a qubit and a bus does not necessarily allow coupling operations between the bus and the qubit. This property was exploited in the RCQS architecture described in Section 2.4 to allow for the selective coupling of qubits in a quantum register. However, in the RCQS, the capacitive coupling between the qubits and the bus always contributes to the effective bus capacitance, regardless of whether the qubit is needed in a given quantum operation. This property necessarily limits the total number of qubits that can be permanently coupled to the bus. Thus, rather than using a direct capacitive coupling between each qubit and the bus, the present invention uses controllable coupling mechanisms to controllably couple all or a portion of a plurality of qubits to a bus. The use of the controllable coupling mechanism overcomes the limitation of excessive capacitance because qubits coupled to the bus by controllable coupling mechanisms in the second (uncoupled) state contribute zero or substantially zero capacitance to the bus. Thus, in the present invention, more qubits can be coupled to the bus than in the RCQS architecture described in Section 2.4 without exceeding the capacitance threshold of the bus that, once exceeded, precludes useful quantum computation. In typical operation, at any give time, only a subset of the controllably coupled qubits are in their first (coupled) state, so that the capacitance threshold of the bus is not exceeded. For typical architectures, $C_{resonator}$=5.8 pF, and $C_{qubit}$=5.5 fF. Qubits can be added to the bus, so long as the total sum of the qubit capacitances does not approach $C_{resonator}$. In some embodiments, 10-100 qubits can be added to the bus before the sum of the qubit capacitances approaches the capacitance of the resonator and adversely affects the operation of the bus.

In some embodiments of the present invention, a mechanism for controllably coupling a qubit to a bus comprises a variable electrostatic transformer (VET), such that in an uncoupled state the VET is tuned to have zero capacitance, and in a coupled state the VET is tuned to have a finite capacitance appropriate for controllably coupling the qubit with the bus.

Figure 3A:
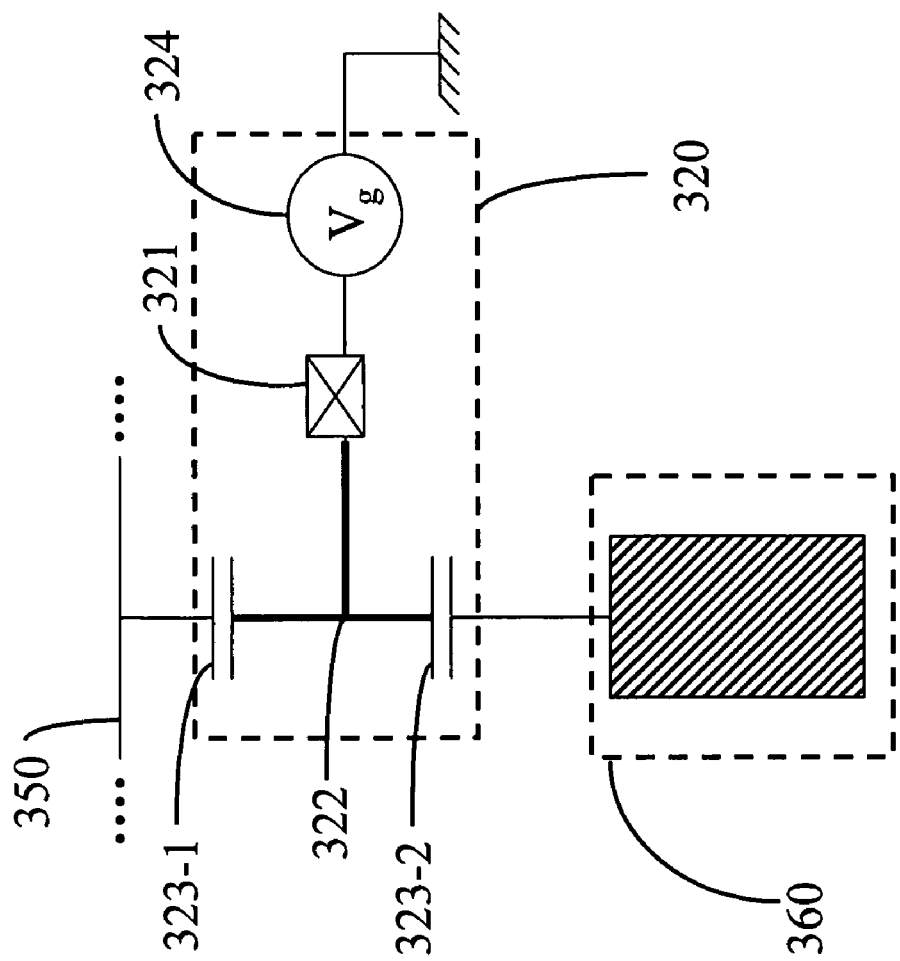
FIG. 3A and FIG. 3B illustrate mechanisms for coupling a qubit to a superconducting bus in accordance with embodiments of the present invention.

FIG. 3A illustrates an embodiment of the present invention in which a controllable coupling mechanism 320 controllably couples a qubit 360 and a bus 350. One mechanism for controllable coupling 320 comprises the use of an island 322 isolated by capacitors 323-1 and 323-2, a Josephson junction 321, and a gate voltage 324. In some embodiments, gate voltage 324 is tuned to control the effective capacitance of controllable coupling mechanism 320. In some embodiments, controllable coupling mechanism 320 has a first (coupled) state, such that the effective capacitance between qubit 360 and bus 350 is some finite value other than zero, and an uncoupled state, in which the effective capacitance between qubit 360 and bus 350 is zero or substantially zero. The interaction between qubit 360 and bus 350 is determined in part by the effective bus capacitance of bus 350. The effective capacitance of the bus is, in turn, is determined by the physical size of bus 350 and by the number of sources of capacitance (e.g., capacitance associated with qubits 360) attached to the bus. When controllable coupling mechanism 320 is in the second (uncoupled) state, it provides zero or substantially zero effective capacitance to the effective capacitance of bus 350. Hence, in some embodiments of the present invention, the effective bus capacitance is a function of (i) the size of the bus and (ii) the number of controllable coupling mechanisms 320 coupled to the bus in a coupled state. In such embodiments, the effective bus capacitance is not a function of the number of qubits 360, per se, that are coupled to the bus. Mechanisms 320 can be manufactured using known lithographic and/or nanotechnology techniques.

Fabrication of mechanisms 320, qubits 360, bus 350 and other components of the present invention are well known in the art. Many of the processes for fabricating superconducting circuits are the same as, or similar to, those established for semiconductors. One important aspect of fabrication is the composition of the circuit. Niobium (Nb) and aluminum (Al) are superconducting materials common to superconducting circuits. Less commonly used are superconducting materials such as lead, niobium (75%)-titanium (25%), and niobium-tin. Further, any of the 40 K (e.g., a 1-2-3 ceramic such as $YBa_2Cu_3O_{6.9}$) or the 95 K high-temperature superconductor materials can be used. See, for example, Hunt, 1989, *Superconductivity Sourcebook*, pp. 9-13, John-Wiley & Sons, New York. In some embodiments of the present invention, substantial portions of mechanisms 320 and qubits 360 are fabricated from niobium or aluminum. Insulating material, such as aluminum oxide or silicon oxide, is also used for the insulating gap in Josephson junctions. The process for fabricating Josephson junctions is sometimes called a trilayer process, since a Josephson junction includes three distinct layers: a bottom electrode, an insulating layer, and a top electrode. The electrodes are made from superconducting material. For example, the composition of a Josephson junction layer can be written as Nb—$AlO_x$—Nb, where the Nb layers are the electrodes and $AlO_x$ (aluminum oxide) is the insulating layer. In some embodiments of the present invention, the superconducting chip comprises niobium or aluminum circuits deposited on a silicon wafer. In some embodiments of the present invention, the superconducting chip comprises niobium or aluminum circuits deposited on oxidized silicon ($SiO_x$) disposed on top of a silicon wafer. The depth of the oxidized silicon layer can be as little as several hundred nanometers.

The exact fabrication method used depends on the composition and size of the Josephson junction. For example, when fabricating large (e.g., 3×3 $\mu m^2$) Nb—$AlO_x$—Nb junctions according to one known fabrication approach, the first step involves depositing a thin film of photoresist onto the wafer. The photoresist is then exposed using optical lithography to define the areas on the chip where the junctions will reside. The photoresist is then developed, causing the exposed areas to be removed. Next, the niobium bottom electrode of the junction is deposited by sputtering, followed by the deposition of a pure aluminum layer that is also deposited by sputtering. This aluminum layer is subsequently oxidized to form the insulating material. The thickness of the insulating layer determines junction parameters, such as capacitance and critical current density, and is usually between about a few nanometers to several hundred nanometers. The top layer is then deposited by sputtering. The sputtering of the junction layers is usually done at an angle normal to the wafer substrate. A lift-off is performed, which etches away the remaining photoresist and any trilayer areas that formed on top of it, leaving behind only the areas, which were deposited in the developed photoresist regions. A second photoresist mask is used to expose certain areas and reactive ion etching is performed, which etches part of the top niobium electrode away, thereby defining the effective junction area. The sides of the junction are electrically insulated by deposition of silicon oxide. Finally, another film of niobium is lithography deposited to connect the top electrode to other circuitry. For more information, see Kohlstedt et al., 1993, *IEEE Transactions on Applied Superconductivity* 3, 2197; Yuda et al., 1987, *Japan Journal of Applied Physics* 26(3):L166; Wallraff, 2000, Thesis, Friedrich-Alexander University of Erlangen-Nuremberg, Germany, pp. 20-21, each of which is hereby incorporated by reference in its entirety.

For smaller junctions, like submicron junctions, other techniques such as shadow evaporation have been used. Submicron junctions are junctions that have at least one spatial dimension that is less than a micron in size. To illustrate, consider the fabrication of a small Al—Al$_2$O$_3$—Al Josephson junction. In one fabrication approach, first the silicon wafer is cleaned and two resist layers are deposited on the substrate. The upper resist layer is several tens of nanometers thick while the lower resist layer is a few hundred nanometers thick and is more sensitive to electrons. The device patterns are etched using an electron beam lithography technique. Afterwards, the resist is developed and etched off. Due to backscattering of electrons and the greater sensitivity of the lower resist layer, a larger portion of the lower layer will be removed relative to the upper layer, forming an undercut. The sample is mounted in an evaporator with a sample holder that is rotated and double-angle evaporation is performed. In double-angle evaporation, the bottom aluminum electrode is sputtered onto the wafer at an angle α. This is followed by deposition and oxidation of a thin insulating layer, and finally sputtering of the upper layer at an angle −α. The angled deposition, combined with the undercutting of the resist, allows the formation of junctions with small dimensions. The process is finished by a lift-off, removing excess resist and trilayer depositions. More information on fabrication processes for small junctions can be found in Dolan, 1977, *Applied Physics Letters* 31, 337; Majer, 2002, Thesis, Delft University of Technology, pp. 12-13; Paauw, 2001, Thesis, Delft University of Technology, pp. 34-36, 58-60; Born et al., 2001, *IEEE Transactions on Applied Superconductivity* 11, 373; Koval et al., 1999, *IEEE Transactions on Applied Superconductivity* 9, 3957; and Fetter et al., 1983, U.S. Pat. No. 4,370,359, each of which is hereby incorporated by reference in its entirety.

In some embodiments of the present invention, Josephson junction 321 is a submicron junction and double-angle evaporation is used to deposit the junction layers. In some embodiments of the present invention, the Josephson junction is not submicron and the junction layers are sputtered at an angle normal to the wafer surface. In some embodiments of the present invention, Josephson junction 321 has feature sizes that are less than 2 microns and electron beam lithography is used to pattern the chip. In some embodiments of the present invention, Josephson junction 321 has feature sizes that are more than 2 microns and photolithography is used to pattern the chip.

Furthermore, similar and alternative fabrication strategies are described in Van Zant, 2000, *Microchip Fabrication*, McGraw-Hill, New York; *Handbook of Microlithography, Micromachining, and Microfabrication*, Rai-Choudhury ed. 1997, The Society of Photo-Optical Instrumentation Engineers, Bellingham, Wash.; Levinson, 2001, *Principals of Lithography*, The Society of Photo-Optical Instrumentation Engineers, Bellingham, Wash.; and Madou, *Fundamentals of Microfabrication, The Science of Miniaturization*, Second Edition, 2002, CRC Press LLC, Boca Raton, Fla., each of which is hereby incorporated by reference in its entirety.

Capacitances between qubit 360 and bus 350 that are useful for performing a coupling operation between the two components range from about 1 attofarad to about 1 nanofarad. As discussed in Section 5.4, below, examples of qubits 360 are phase qubits, charge qubits, and hybrid qubits. Moreover, combinations of any of these qubit types can be attached to bus 350 and used as a quantum register.

5.1.1 Controllable Coupling Mechanisms

An overview of inventive quantum computing architectures in accordance with the present invention has been presented. Next, more details of a controllable coupling mechanism will be described. Then, methods for coupling a first qubit with a second qubit in a quantum register that includes the inventive architecture will be described.

Again referring to FIG. 3A, in one embodiment, controllable coupling mechanism 320 is a VET. See, for example, Averin and Bruder, 2003, "Variable Electrostatic Transformer Controllable Coupling of Two Charge Qubits," Phys. Rev. Lett. 91, 57003, which is hereby incorporated by reference in its entirety. Conventional capacitive coupling of charge qubits permits the charge in a first cooper pair box (CPB) to interact with the charge in a second CPB, which is coupled to the first CPB, resulting in always-on coupling and leading to a constraint in implementing quantum computing algorithms. It is desirable to be able to switch off such a coupling in some controllable way. To address these constraints, Averin and Bruder used a VET to provide a tunable coupling between two charge qubits, such as CPBs or Josephson charge qubits. The VET proposed by Averin and Bruder separates charge qubits using a tunable capacitance. Averin and Bruder demonstrated that the VET is capable of being tuned to zero capacitance, hence removing the electrostatic coupling between charge qubits.

In FIG. 3A, Josephson junction 321 is included roughly orthogonal to the coupling direction defined by the junction of qubit 360 and bus 350 to island 322. More specifically, this coupling direction is defined by the capacitive coupling of qubit 360 and bus 350 to central island 322 of transformer 320 through capacitances 323-1 and 323-2. Gate voltage 324 is adjusted to achieve two states, a first (coupled) state in which bus 350 and qubit 360 are capacitively coupled to each other and a second (uncoupled) state in which bus 350 and qubit 360 are not capacitively coupled to each other. Josephson junction 321 has dimensions ranging from about 0.001 square microns to about 1,000 square microns. Capacitances 323-1 and 323-2 have values ranging from about 1 attofarad to about 1 nanofarad. An example of a gate voltage in the first state is 2.2 μV. An example of a gate voltage in the second state is 4 μV. However, these values are by way of illustration only and other values are possible.

5.1.2 Coupling Operations Using a Controlled Resonator

Figure 3B:
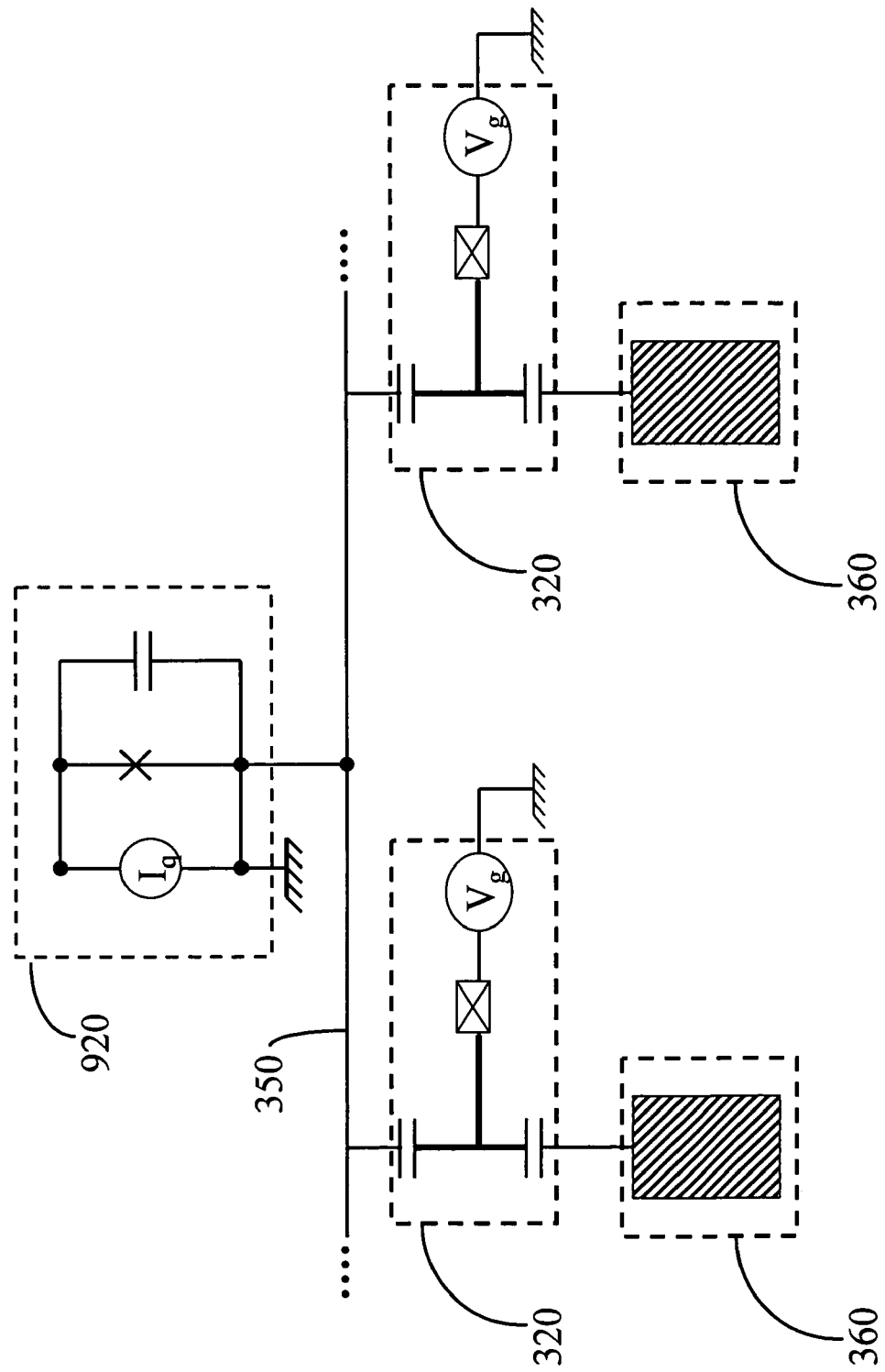

Referring to FIG. 3B, one aspect of the present invention provides a coupling operation between a first qubit 360 and a second qubit 360 connected to a superconducting bus 350. A first and second controllable coupling mechanism 320 that respectively couple the first and second qubits 360 to bus 350 are in a first coupled state. In the operation, first and second qubits 360 are tuned to perform a coupling operation such that the quantum information stored in first and second qubits 360 interact with bus 350 and hence with each other. In some embodiments, a tuning operation comprises first tuning the characteristics of bus 350 such that the quantum energy level separation associated with bus 350 matches a quantum energy level separation associated with the first qubit 360 for a first period of time. Then the characteristics of the bus are tuned such that the quantum energy level separation associated with bus 350 matches a quantum energy level difference associated with the second qubit 360 for a second period of time. In some embodiments the first period of time and the second period of time each independently range between one picosecond and one millisecond. In other words, there is no requirement that the first period of time and the second period of time be the same.

In some embodiments, tuning the characteristics of the bus comprises first tuning a quantum device (e.g., device 920) that is coupled to the bus. In some embodiments, tuning this quantum device comprises applying a bias current (for example, in a CBJJ, applying a bias current between 0.97 and 0.995 of the critical current of the Josephson junction) directly to the quantum device, or applying a gate voltage directly to the quantum device. The exact gate voltage depends on the characteristics of the quantum device, such as capacitance values, but in some embodiments the applied gate voltage is between 1 nV and 1 μV, and in other embodiments the applied gate voltage is between 1 μV and 1 V.

Figure 6:
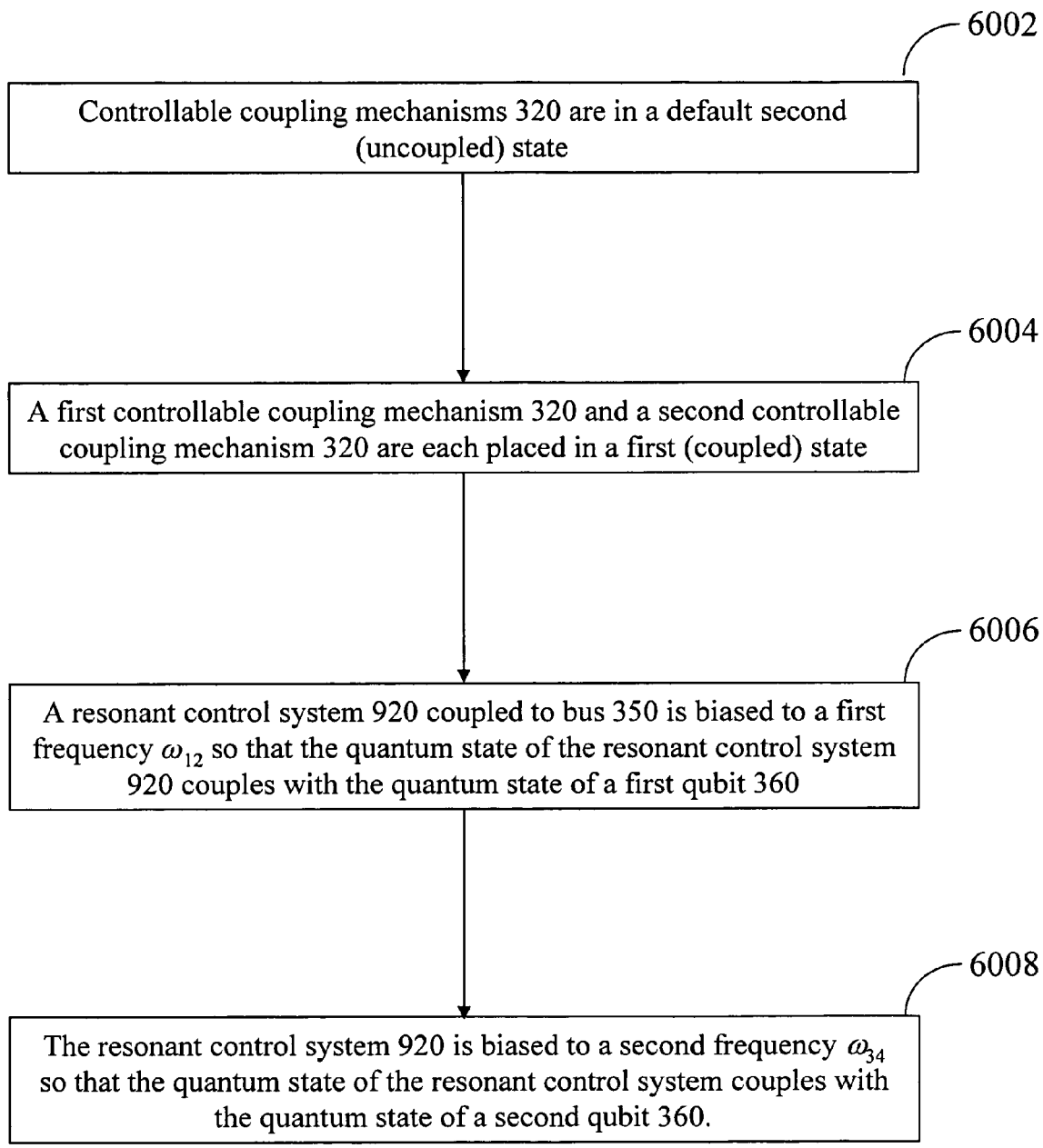
FIG. 6 illustrates a method for entangling or performing a coupling operation between a first and second qubit in a quantum register in accordance with an embodiment of the present invention.

FIG. 6, with reference to the elements of FIG. 3B, illustrates a method in accordance with this aspect of the invention. In step 6002, controllable coupling mechanisms 320 are in a default second (uncoupled) state so that qubits 360 connected to bus 350 by mechanisms 320 do not contribute to the effective-capacitance of the bus. In step 6004, a first controllable coupling mechanism 320 that controllably couples the first qubit 360 to bus 350 and a second controllable coupling mechanism 320 that controllably couples the second qubit 360 to bus 350 are each placed in a first (coupled) state thereby coupling the first and second qubits 360 to bus 350. There is no requirement in step 6004 that the two controllable coupling mechanisms be placed in the coupled state at the same time. They can, for example, be sequentially placed in the coupled state.

In step 6006, a resonant control system 920 (e.g., resonant controller 920 of FIG. 1) that is coupled to bus 350 is biased to a first frequency $\omega_{12}$ that represents the energy differential between a first quantum energy level and a second quantum energy level (e.g., the lowest two quantum energy levels) of first qubit 360 so that the quantum state of resonant control system 920 couples with the quantum state of the first qubit 360 via bus 350. The resonant control system 920 remains at frequency $\omega_{12}$ for a sufficiently long period of time for the resonant controller and the first qubit 360 to couple via bus 350.

In step 6008, resonant control system 920 is biased to a second frequency $\omega_{34}$ that represents the energy differential between a first quantum energy level and a second quantum energy level (e.g., the lowest two quantum energy levels) of second qubit 360 so that the quantum state of the resonant control system 920 couples with the quantum state of the second qubit 360 via bus 350. The resonant control system 920 remains at frequency $\omega_{34}$ for a sufficiently long time for the resonant control system 920 and the first qubit 360 to couple via bus 350. In the method illustrated in FIG. 6, the first frequency $\omega_{12}$ and the second frequency $\omega_{34}$ are different.

Figure 7:
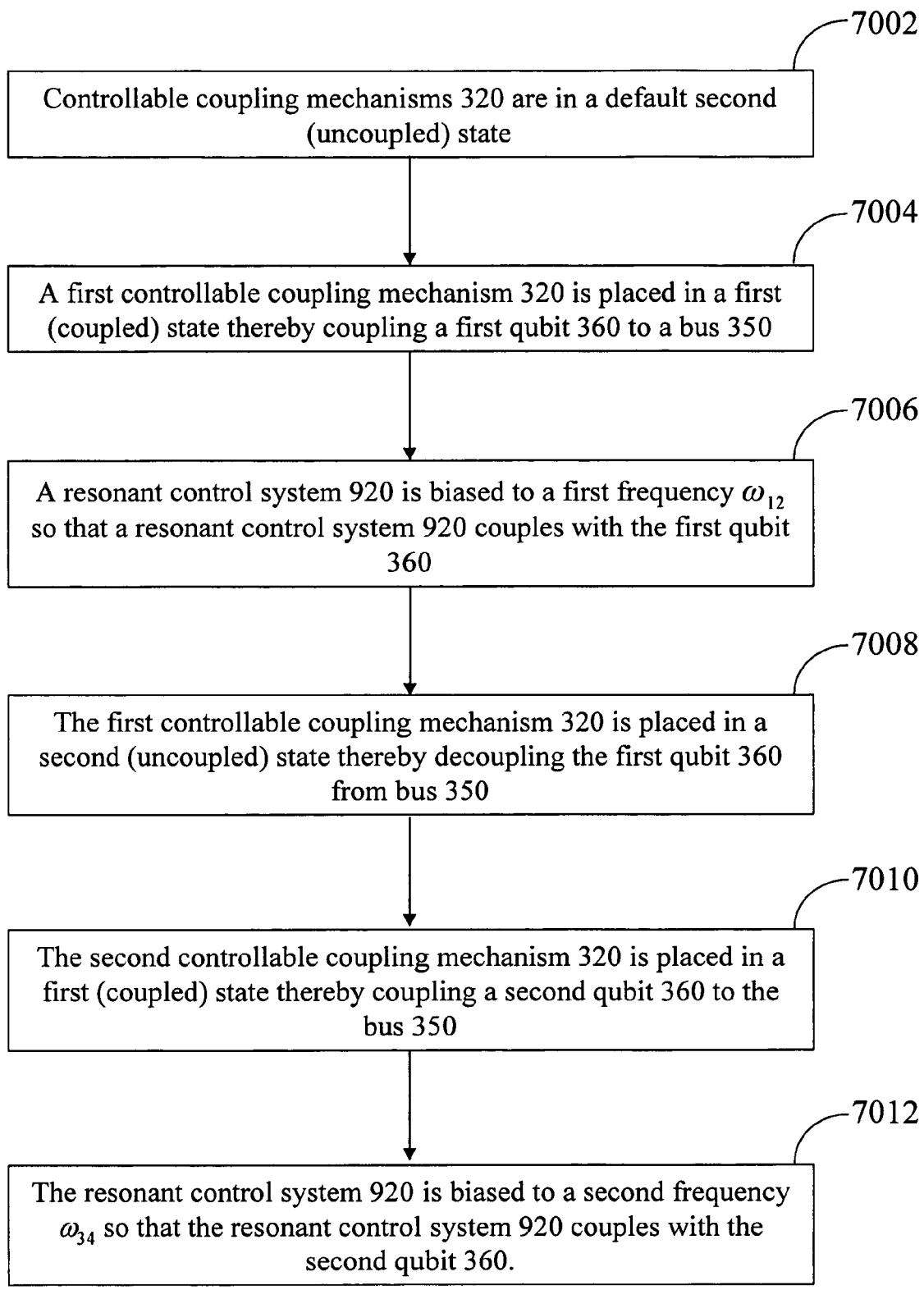
FIG. 7 illustrates a method for performing a coupling operation between a first and second qubit in a quantum register in accordance with an embodiment of the present invention.

Steps 6002-6008 allow for the coupling of any two qubits 360 coupled to bus 350. The limitation of the method illustrated in FIG. 6 is that the first and second qubits 350 must have unique energy differentials. The method illustrated in FIG. 7, with reference to the elements of FIG. 3B, circumvents this requirement.

In step 7002, controllable coupling mechanisms 320 are in a default second (uncoupled) state so that qubits 360 connected to bus 350 by mechanisms 320 do not contribute to the effective capacitance of the bus. In step 7004, a first controllable coupling mechanism 320 that controllably couples first qubit 360 to bus 350 is placed in a first (coupled) state thereby coupling first qubit 360 to bus 350.

In step 7006, a resonant control system 920 (e.g., resonant controller 920 of FIG. 3B) that is coupled to bus 350 is biased to a first frequency $\omega_{12}$ that represents the energy differential between a first quantum energy level and a second quantum energy level (e.g., the lowest two quantum energy levels) of first qubit 360 so that the quantum state of the resonant control system 920 couples with the quantum state of the first qubit 360. The resonant control system 920 remains at first frequency $\omega_{12}$ for a sufficiently long period of time for resonant control system 920 and the first qubit 360 to couple. In some embodiments this time ranges between one picosecond and one millisecond.

In step 7008, the first controllable coupling mechanism 320 that controllably couples the first qubit 360 to bus 350 is placed in a second (uncoupled) state thereby capacitively decoupling first qubit 360 from bus 350. In step 7010, the second controllable coupling mechanism 320 that controllably couples second qubit 360 to bus 350 is placed in a first (coupled) state thereby capacitively coupling the second qubit 360 to bus 350.

In step 7012, the resonant control system 920 is biased to a second frequency $\omega_{34}$ that represents the energy differential between a first quantum energy level and a second quantum energy level (e.g., the lowest two quantum energy levels) of second qubit 360 so that the quantum state of the resonant control system 920 couples with the quantum state of the second qubit 360. In the method illustrated in FIG. 7, frequencies $\omega_{34}$ and $\omega_{12}$ can be the same or different. Resonant control system 920 remains at second frequency $\omega_{34}$ for a sufficiently long time for the resonant control system and the second qubit 360 to couple. In some embodiments this time ranges between one picosecond and one millisecond.

Values for the frequencies $\omega_{12}$ and $\omega_{34}$ depend on what kind of qubit is used, and also on the various characteristics of the qubits, such as the charging energy $E_C$ and the Josephson energy $E_J$, which depend on the physical parameters of the Josephson junctions. For quantronium qubits, $\omega$ has a nominal value of about 16 GHz, but can range between 1 and 50 GHz. For charge qubits, $\omega$ ranges between about 7 GHz and about 70 GHz. For phase-charge qubits, $\omega$ has a nominal value of around 6.8 GHz, and ranges between about 1 and 100 GHz.

5.1.3 Other Single Bus Coupling Embodiments

Figure 8:
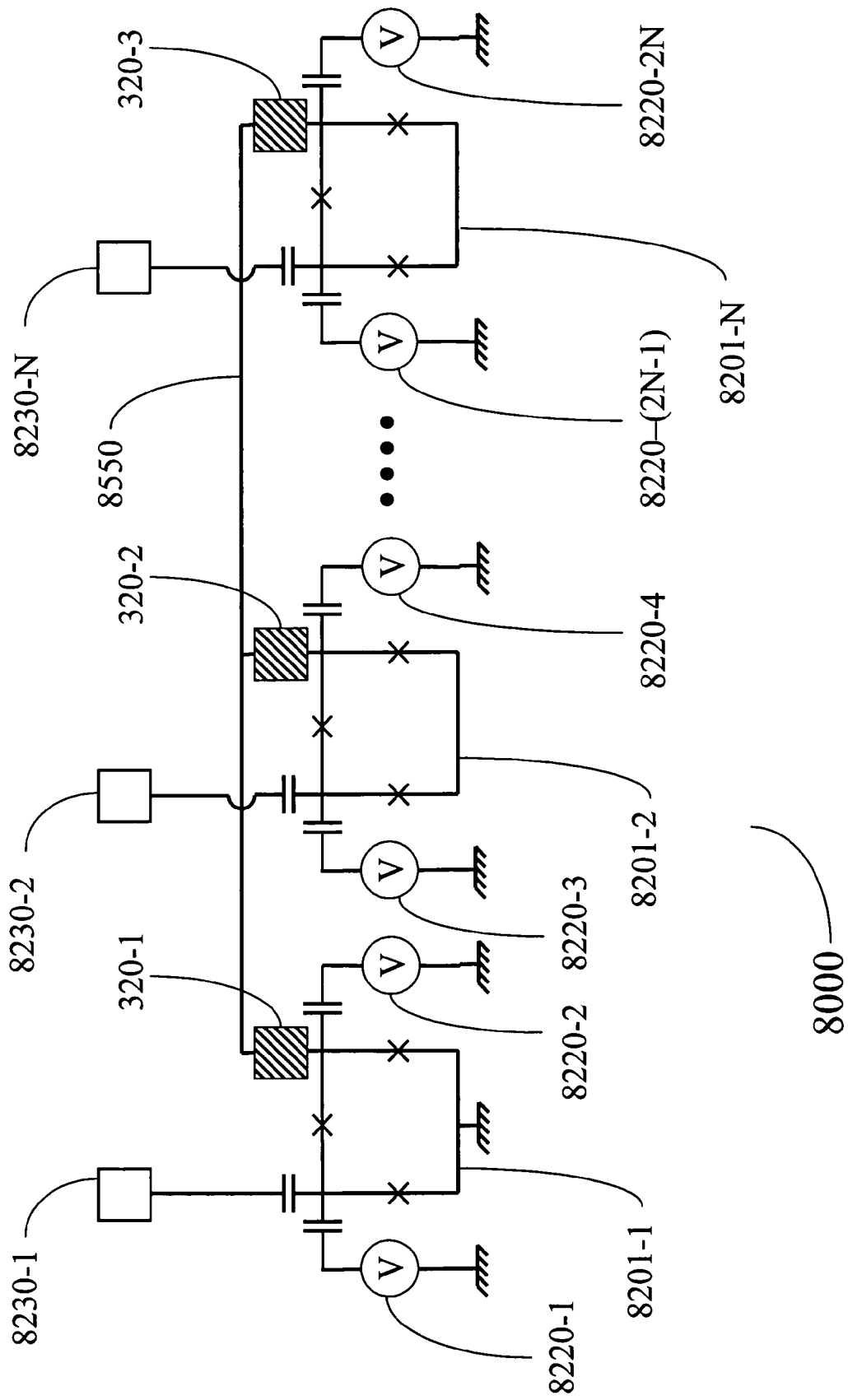
FIG. 8 illustrates an apparatus that allows for the controlled coupling of qubits in a quantum register in accordance with an embodiment of the present invention.

In some embodiments of the present invention, characteristics (e.g., gate charge) of the first and second qubits are tuned, such that the quantum information in one qubit interacts with the quantum information in the second qubit through a controllable coupling mechanism 320. In some embodiments, the apparatus, systems, and methods found in U.S. patent application Ser. No. 10/934,049, Sep. 3, 2004, entitled "Superconducting Phase-Charge Qubits," hereby incorporated by reference in its entirety and referred to herein as Amin et al., are modified such that all or a portion of the qubits coupled to a superconducting bus are coupled through a controllable coupling mechanism 320. FIG. 8 illustrates.

In FIG. 8, a structure 8000 for controllably coupling and reading out a plurality of phase-charge qubits 8201 is provided. In some embodiments in accordance with FIG. 8, element 320 is a controllable coupling mechanism that is equivalent to (same as) the controllable coupling mechanism illustrated in FIG. 3. Structure 8000 comprises a plurality of N phase-charge qubits 8201, labeled from 8201-1 through 8201-N. Each phase-charge qubit 8201 has one island capacitively coupled with a bus island 8550 through a controllable coupling mechanism 320. In Amin et al., each phase-charge qubit 8201 is directly coupled with bus island 8550 through a capacitor. Thus, Amin et al. has the drawback that the effective capacitance of bus island 8550 is a function of the number of qubits coupled to the island. This significantly limits the number of qubits that can be coupled to the bus island 8550 because of the build up in the effective-capacitance of bus island 8550 as additional qubits 8201 are added. As such, the present invention allows for significantly more qubits to be added to each bus island 8550.

As in Amin et al., each phase-charge qubit 8201 has an island capacitively coupled to a readout apparatus 8230. Structure 8000 additionally comprises gate voltages 8220-(2i−1), where i is the qubit label in the range from 1 to N, that control the charge on the corresponding qubit's readout island and gate voltage 8220-2i that control the charge on the corresponding qubit's coupling island.

Amin et al. teaches a method for performing coupling operations between a first phase-charge qubit 8201-L and a second phase-charge qubit 8201-M, where L and M are independent integers between 1 and N, in which gate voltages 8220-2L and 8220-2M that correspond to qubits 8201-L and 8201-M are tuned such that the charge of the coupling islands on qubits 8201-L and 8201-M depends on the quantum information contained in qubits 8201-L and 8201-M, respectively. The qubits are maintained in this state for a period of time such that a coupling operation is performed with these qubits to completion. In some embodiments, this period of time ranges between one picosecond and one millisecond. Gate voltages 8220-I, where I represents each integer between 1 and 2N, other than the integers 2L and 2M, are tuned so that the effective charge on the coupling islands in qubits 8201-J where J represents each integer between 1 and N other than the integers L and M is small enough to prevent these qubits from interacting with bus island 8550. In some embodiments of the present invention, two or more phase-charge qubits 8201 are coupled to bus island 8550 simultaneously using the method described above. In the present invention, the Amin et al. apparatus and methods are enhanced by setting the respective controllable coupling mechanisms 320 corresponding to each qubit to be coupled to (i) a first (coupled) state during coupling operations and (ii) a second (uncoupled) state at all other times.

5.2 Bus and Pivot Segment Architectures

In another aspect of the present invention, a quantum processing architecture includes a plurality of superconducting buses, where each superconducting bus forms a bus segment, one or more pivot segments, and a plurality of controllable coupling mechanisms for controllably coupling a pivot segment to a bus segment. In some embodiments, there are two or more buses, between two and twenty buses, more than ten buses, or more than twenty buses. Each controllable coupling mechanism has a first (coupled) state in which a controllable coupling operation between a bus segment, or a qubit in a bus segment, and a pivot segment is possible. Further, each controllable coupling mechanism has a second (uncoupled) state in which the pivot segment does not capacitively affect the bus segment. The pivot segments are used to control the flow of quantum information between bus segments. In some embodiments of the present invention, the requirements of each bus segment are reduced, as compared with Blais et al., by using pivot segments to mediate quantum coupling operations such as coupling operations. This further reduces the number of required steps in realizing a coupling operation between qubits in different bus segments.

Figure 4:
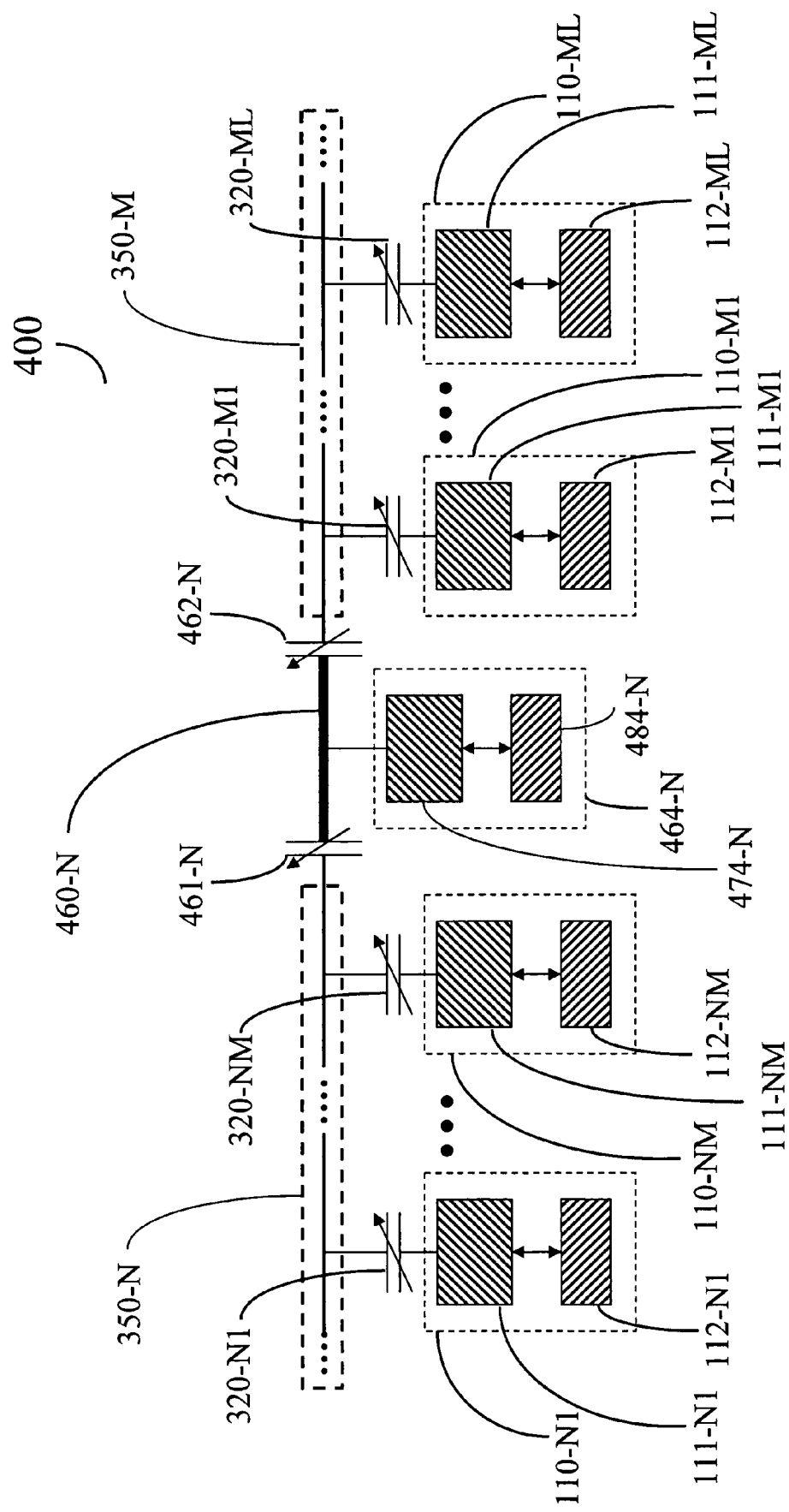
FIG. 4 illustrates a bus architecture in accordance with an embodiment of the present invention.

FIG. 4 illustrates a section of bus architecture 400 in accordance with an embodiment of the present invention. Bus architecture 400 includes superconducting bus segments 350-N and 350-M separated by a pivot segment 460-N, qubits 110-N1 through 110-NM connected to bus 350-N through controllable coupling mechanisms 320-N1 through 320-NM, and qubits 110-M1 through 110-ML connected to bus segment 350-M through controllable coupling mechanisms 320-M1 through 320-ML. Qubits 110 are each associated with a respective qubit controller 112 and qubit device 111, and are each connected to either bus segment 350-N or 350-M through a controllable coupling mechanism 320, such as the variable electrostatic transformer (VET) illustrated in FIG. 3A. Each controllable coupling mechanism 320 has a first (coupled) state, characterized by a finite nonzero capacitance, such that a coupling operation between the corresponding qubit 110 and bus 350 is possible, and a second (uncoupled) state, characterized by a zero or substantially zero capacitance, whereby the corresponding qubit 110 does not capacitively affect the corresponding bus segment 350 and qubit 110 is uncoupled from the bus segment.

Pivot segments 460 can be used to controllably perform coupling operations between any qubit 110-N connected to bus 350-N and any qubit 110-M connected to bus 350-M. Each pivot segment 460 is flanked by a pair of controllable coupling mechanisms 461/462 as illustrated in FIG. 4. Mechanisms 461/462 controllably couple a pivot segment 460 to adjoining bus segments 350. Further, each pivot segment 460 is controllably connected to a pivot device 464. Mechanisms 461/462 each independently have (i) a coupled state, such that a coupling operation is possible between a pivot segment 460 and an adjoining bus segment 350 (or any qubit 110 coupled with the bus segment 350), and (ii) an uncoupled state, such that the state of pivot segment 460 does not affect the respective adjoining bus segment 350.

In some embodiments, mechanisms 461 and 462 are each a VET 320 having the architecture illustrated for element 320 of FIG. 3. In some embodiments of the present invention, pivot device 464-N comprises a quantum device 474-N. In some embodiments, pivot device 464-N further comprises a mechanism 484-N for tuning the energy level separation between the respective energy levels or other characteristics of quantum device 474-N. In some embodiments, pivot device 464-N is the same as qubits 110, that is, quantum device 474-N is the same as qubit device 111 and tuning mechanism 484-N is the same as tuning mechanisms 112.

In some embodiments, tuning mechanism 112 and/or 484 comprises any combination of a current source, a voltage source, and a flux source. Each such source is capable of controlling some aspect of the state of the corresponding qubit 110 and/or pivot device 464. Examples of qubits 110 and/or pivot device 464 useful for the present invention include, but are not limited to, current biased Josephson junction (CBJJ) qubits, phase-charge qubits, quantronium qubits, and charge qubits. See Makhlin et al., 2001, "Quantum-State Engineering with Josephson-Junction Devices," Rev. of Mod. Phys., 73, pp. 357-401, which is hereby incorporated by reference in its entirety, for more description of such qubits 110 and/or 464.

Referring to FIG. 4, when mechanism 461-N is in a coupled (closed) state, a coupling operation is possible between bus segment 350-N and pivot segment 460-N. Typically, pivot segment 460 is either uncoupled from all bus segments or is coupled to a single bus segment at any given time when device 400 is being used to perform quantum computations.

An aspect of the present invention provides methods for using a pivot segment 460 to perform one or more coupling operations on a first qubit 110-N from a first bus segment 350-N and a second qubit 110-M from a second bus segment 350-M in an architecture 400 such as that disclosed in FIG. 4. The pivot segment 460 is controllably coupled to the first bus segment 350-N by a first controllable coupling mechanism 461, and is controllably coupled to the second bus segment 350-M by a second controllable coupling mechanism 462. The first qubit 110-N is controllably coupled to the first bus segment 350-N by a first qubit controllable coupling mechanism 320-N. The second qubit 110-M is controllably coupled to the second bus segment 350-M by a second controllable coupling mechanism 320-M. In one method in accordance with this aspect of the invention, the first controllable coupling mechanism 461 is adjusted from a default uncoupled state to a coupled state, thereby coupling the pivot segment 460 to the first bus segment 350-N. The corresponding first qubit coupling mechanism 320-N is also set to a coupled state, thereby capacitively coupling the first qubit 110-N to the first bus segment 350-N as well. A first coupling operation between the first qubit 110-N and the pivot segment 460 is performed. Then, the first controllable coupling mechanism 461 and the first qubit controllable coupling mechanism 320-N are placed into an uncoupled (open) state, thereby capacitively (and quantum mechanically) isolating the first qubit 110-N and the pivot segment 460 from first bus segment 350-N and thereby decoupling first qubit 110-N and pivot segment 460. Next or simultaneously, the second controllable coupling mechanism 462 is set from a default uncoupled state to a coupled state, thereby capacitively coupling pivot segment 460 with second bus segment 350-M. Also, second controllable coupling mechanism 320-M is set from an uncoupled state to a coupled state, thereby capacitively coupling the second qubit 110-M to the second bus segment 350-M as well. A second coupling operation is performed between pivot segment 460 and second qubit 110-M. Then second controllable coupling mechanism 462 and second controllable coupling mechanism 320-M are set to an uncoupled state, thereby capacitively (and quantum mechanically) isolating qubit 110-M and pivot segment 460 from second bus segment 350-M.

In some embodiments of the invention, after performing the first and second coupling operations, first qubit 110-N, quantum device 474-N, and second qubit 110-M are in an entangled state even though they are no longer coupled to each other. In some embodiments, a coupling operation between first qubit 110-N and second qubit 110-M further comprises unentangling quantum device 474-N This extra step is needed, for example, when performing a square root swap ($\sqrt{\text{SWAP}}$) gate operation. Such a $\sqrt{\text{SWAP}}$ operation is described in Blais et al., 2003, Phys. Rev. Lett. 90, P. 127901, which is hereby incorporated by reference in its entirety.

In one embodiment, quantum device 474-N is unentangled by setting first controllable coupling mechanism 461 and first qubit controllable coupling mechanism 320-N to coupled states, thereby re-coupling pivot segment 460 to first qubit 110-N. A third coupling operation (in this case, more precisely, an unentangling operation) is performed between pivot segment 460 and first qubit 110-N. Then the first controllable coupling mechanism 461 and the first qubit controllable coupling mechanism 320-N are reset to the uncoupled state. After this third operation, the quantum device 474-N is not entangled with first qubit 110-N or second qubit 110-M.

In another such embodiment, quantum device 474-N is unentangled by setting second controllable coupling mechanism 461 and second qubit controllable coupling mechanism 320-M to coupled states, thereby re-coupling pivot segment 460 to second qubit 110-M. A third quantum gate operation (in this case, more precisely, an unentangling operation) is performed between pivot segment 460 and second qubit 110-M. Then the second controllable coupling mechanism 461 and the second qubit controllable coupling mechanism 320-M are reset to the uncoupled state. After this third operation, the quantum device 474-N is not entangled with the first qubit 110-N or second qubit 110-M.

The aforementioned first, second, and third operations can be performed in accordance with the methods described in U.S. patent application Ser. No. 10/419,024, filed May 17, 2003, entitled "Resonant Controlled Qubit System," as well as U.S. patent application Ser. Nos. 10/798,737, 10/801,335, and 10/801,340 each of which are hereby incorporated by reference in its entirety.

Figure 2A:
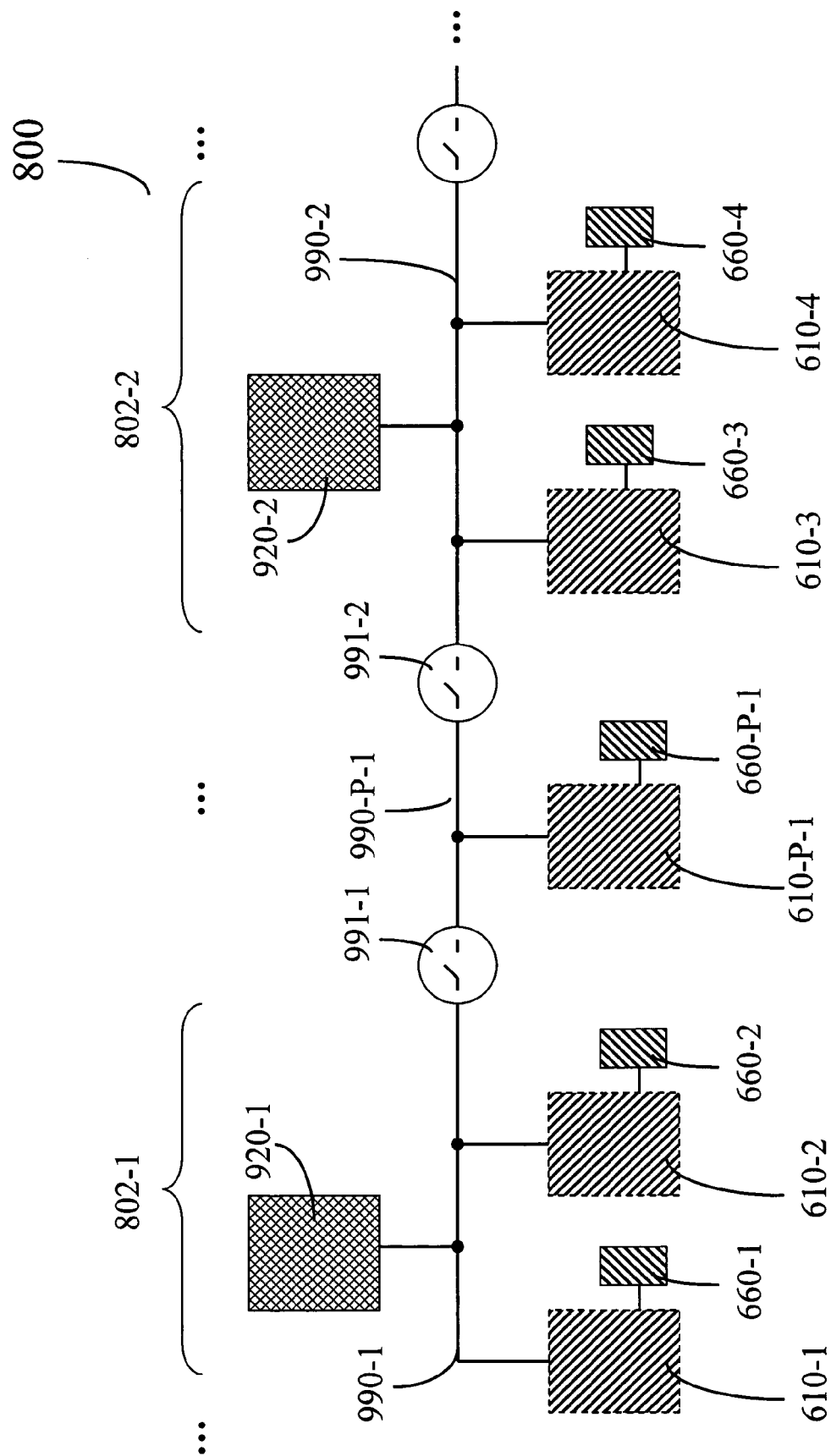
FIG. 2A and FIG. 2B illustrate known bus architectures in accordance with the prior art.
Figure 2B:
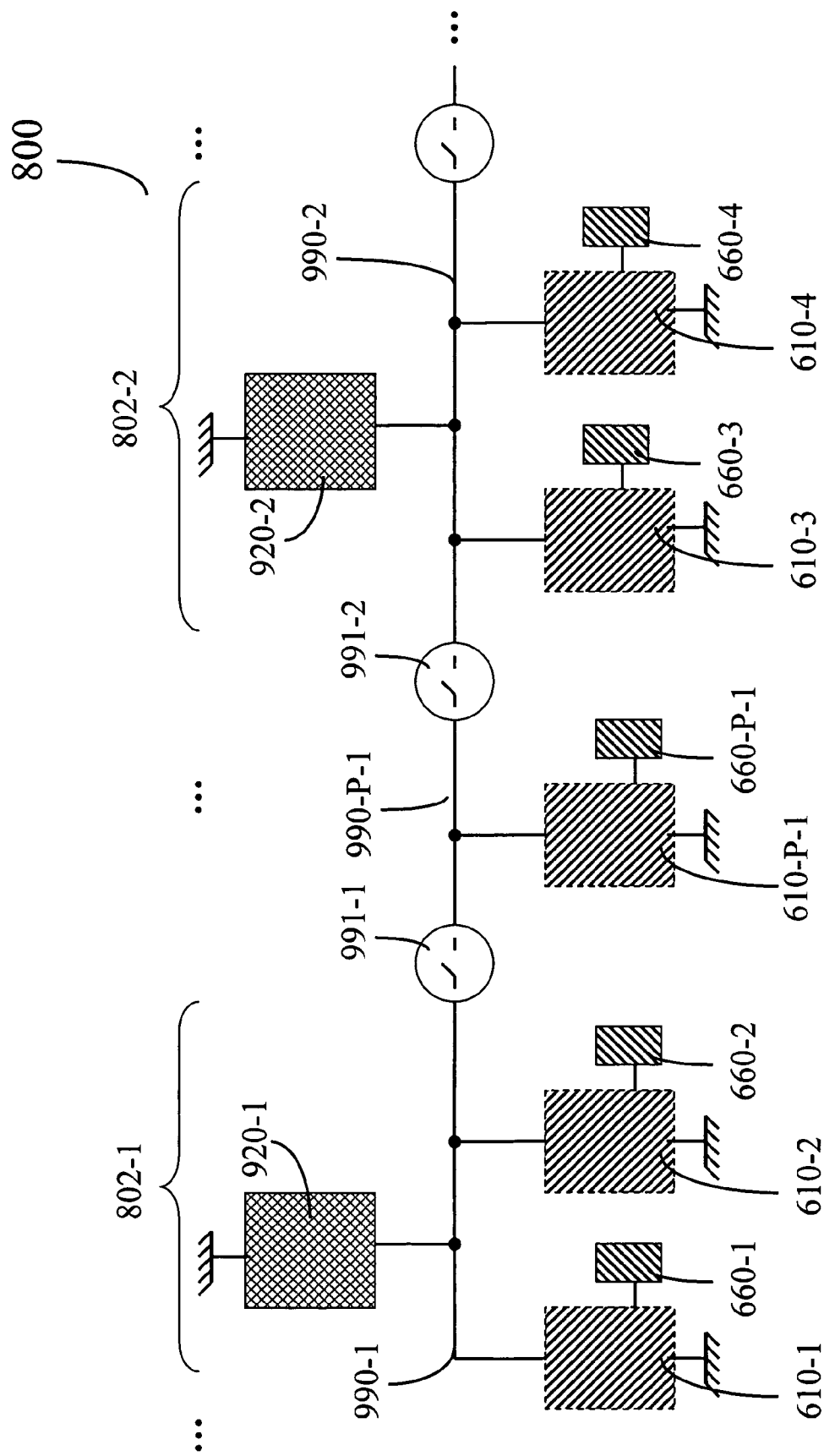

In some embodiments of the present invention, the first, second, and third coupling operations are performed by tuning pivot device 464-N (for example, this may be another qubit, or it may be resonator 920 or FIG. 2) attached to pivot segment 460-N to have an energy level spacing corresponding to the energy level spacing of the qubit to which it is coupled in any given coupling operation. For example, in the first coupling operation, the pivot segment 460-N is tuned to resonate at the frequency corresponding to the energy spacing between a first and second energy level in the first qubit 110-N.

In some embodiments of the present invention, each pivot device 464 does not require a mechanism for tuning its state. In other words, in some embodiments, there is no requirement that each bus segment have a tuning device, such as tuning device 484-N of FIG. 4. In some embodiments, the pivot segment plays the role of mediating the coupling operation. For example, the energy level separation or other characteristics of quantum device 474 of pivot device 464 can be tuned to mediate a coupling operation with the respective qubit. This further reduces the requirements for each bus segment, as well as the number of operations required to implement a coupling operation between qubits in different bus segments.

Another embodiment of the present invention provides a method for entangling or performing coupling operations between phase-charge qubits using an architecture similar to that of FIG. 4. In the method, the pivot segment is used to perform coupling operations between a first qubit from a first bus segment and a second qubit from a second bus segment without any requirement for a tunable bus mechanism. The first and second qubits are phase-charge qubits. The pivot segment is coupled to a quantum device. The pivot segment can be coupled with a phase-charge qubit such that coupling operations can be performed on them. In the method, a first controllable coupling mechanism between the first phase-charge qubit and the first bus segment is placed into a coupled state. A second controllable coupling mechanism between the first bus segment and the pivot segment is placed into a coupled state thereby controllably coupling the first bus segment and the pivot segment. A first coupling operation is performed by tuning the first phase-charge qubit and the quantum device coupled to the pivot segment to a charge-sensitive state for a first duration. Then the first and second controllable coupling mechanisms are placed into an uncoupled state thereby decoupling the first phase-charge qubit and the quantum device.

A third mechanism for controllable coupling, which is between the pivot segment and the second bus segment, is placed into a coupled state. A fourth controllable coupling mechanism that controllably couples the second bus segment to the second phase-charge qubit is placed into a coupled state. A second coupling operation is performed by tuning the second phase-charge qubit and the quantum device coupled to the pivot segment to a charge-sensitive state for a second duration. In this way a coupling operation has been performed on the first and second qubits. The third and fourth controllable coupling mechanisms are then placed into an uncoupled state.

In some embodiments of the invention, the method further comprises again placing the first and second controllable coupling mechanisms into a coupled state, using the above-described steps. A third quantum coupling operation is then performed by tuning the first phase-charge qubit and the quantum device coupled to the pivot segment to a charge-sensitive state for a third duration, causing the pivot segment to become unentangled from the first and second qubits. In an alternative embodiment, the third and fourth controllable coupling mechanisms are again placed in their coupled states and a third coupling operation is performed by tuning the second phase-charge qubit and the quantum device coupled to the pivot segment to a charge-sensitive state for a third duration, which causes the pivot segment to become unentangled from the first and second qubits.

In some embodiments of the present invention, tuning a phase-charge qubit to a charge-sensitive state comprises applying a gate voltage to the portion of the phase-charge qubit that is coupled to a bus segment or to the mechanism for controllable coupling and setting the gate voltage to a predetermined value. This gate voltage is predetermined such that the charge on the islands has a certain value. For certain values of the charge on the islands the phase-charge qubit is decoupled from the bus segment, and for certain values of the charge on the islands, the phase-charge qubit is coupled to the bus segment. Detailed methods for manipulating the phase-charge qubit are described in Amin et al. In some embodiments of the present invention, the quantum device coupled to the pivot segment is also a phase-charge qubit.

5.2.1 Multidimensional Qubit Coupling Architectures

Figure 5A:
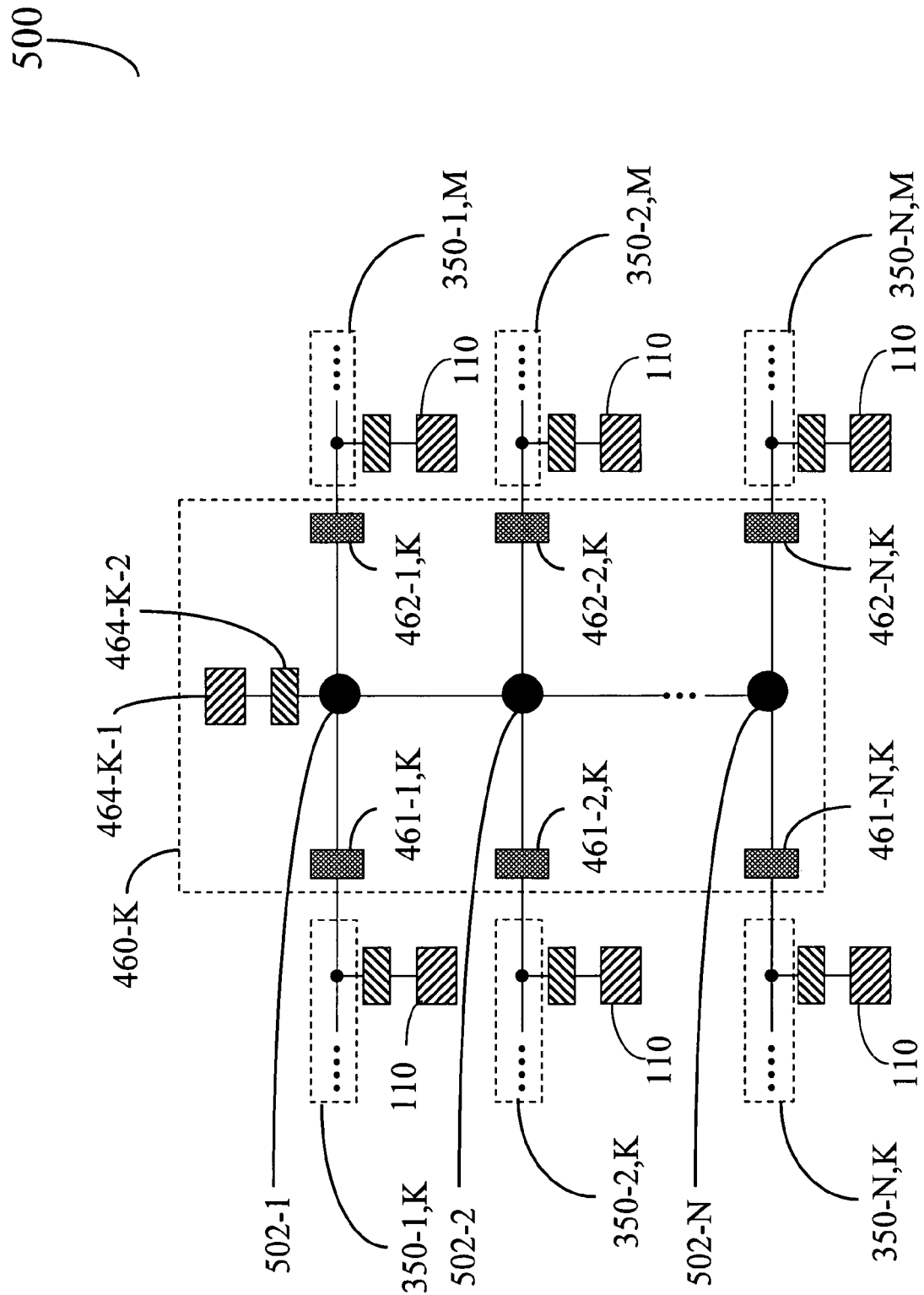
FIG. 5A and FIG. 5B illustrate bus architectures in accordance with an embodiment of the present invention.
Figure 5B:
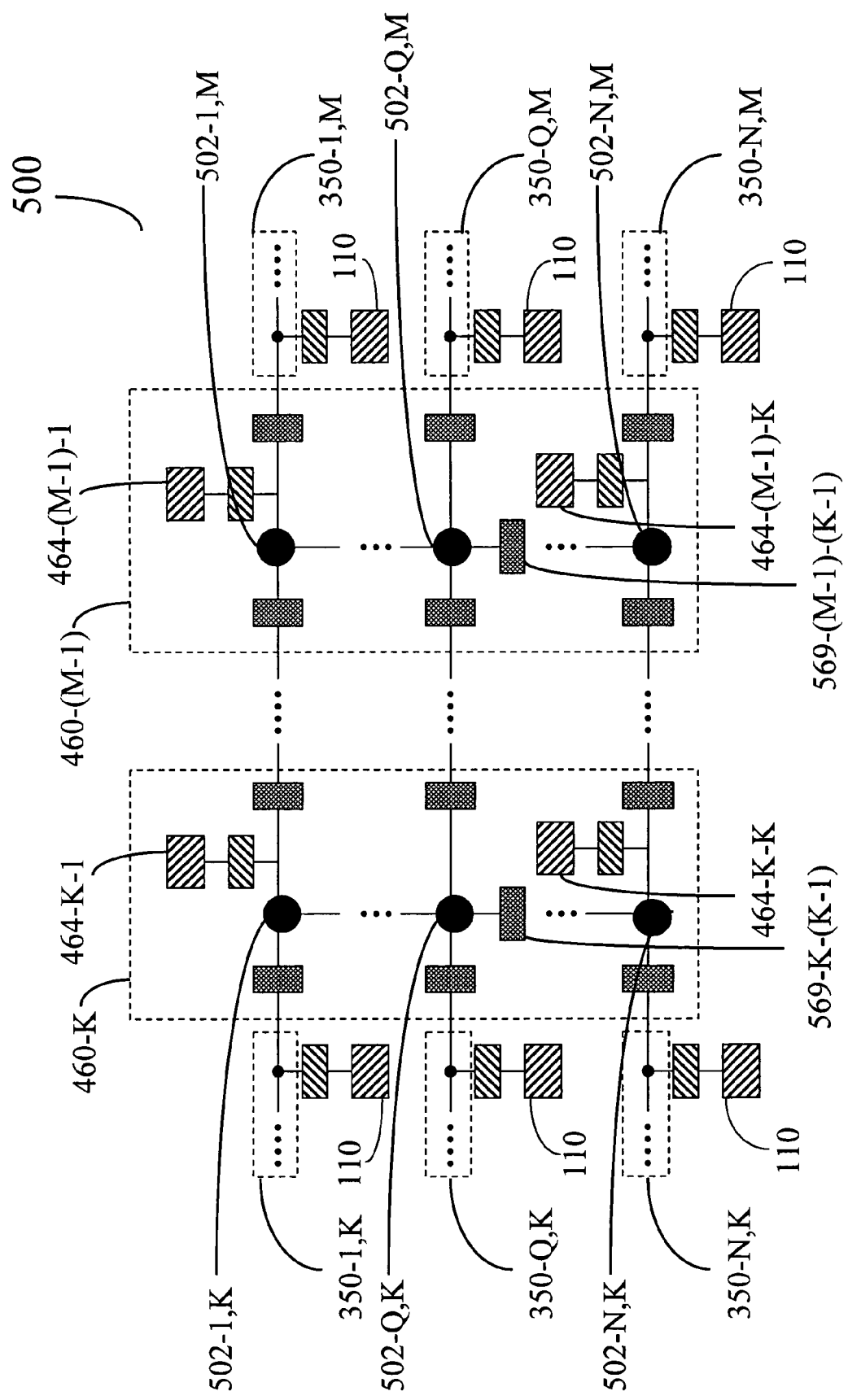

FIG. 5A and FIG. 5B illustrate additional embodiments of the present invention.

In such embodiments, a bus architecture comprises a plurality of rows of bus segments.

Each row comprises a plurality of bus segments and one or more pivot segments. In some embodiments of the invention, a pivot segment is capable of performing a coupling operation between bus segments in a row or between bus segments in different rows.

FIG. 5A illustrates a portion 500 of a two-dimensional bus architecture comprising N rows by M rows that includes a pivot segment 460-K. Each row, 350-1 through 350-N, comprises a plurality of bus segments 350 and each bus segment 350 is connected to a plurality of qubits 110. Pivot segment 460-K comprises quantum device 464-K-1 and, optionally, coupling element 464-K-2. Pivot segment 460-K further comprises mechanisms for controllable coupling 461 and 462 for coupling pivot segment 460-K to bus segments 350. The two-dimensional bus architecture of FIG. 5A can be extended into a third dimension in which there are successive layers of architecture 500, each layer controllably connected to the other by vias extending from, for example, positions 502 of architecture 500. In other embodiments, such vias are positioned at other locations within pivot segment 460-K. In still other embodiments, not every row 350 includes a via. In fact, in one embodiment, there is only one via in all of pivot segment 460-K. In some embodiments, these vias are bordered by controllable coupling mechanisms (not shown) so that individual layers 500 can be controllably coupled to each other. In this way, any qubit in a three-dimensional qubit array can be coupled with any other qubit in the three dimensional qubit array using the methods described in the case of a one-dimensional array described above.

FIG. 5B illustrates an embodiment of the present invention comprising a plurality of pivot segments 460 and a plurality of bus segments 350. Pivot segments 460 further comprise controllable pivot segment coupling mechanisms 569 for coupling a first subsegment of a pivot segment 460 to a second subsegment of a pivot segment 460. In some embodiments of the invention, controllable coupling mechanism 569 allows intermediate coupling operations to be performed between subsegments of pivot segment 460. Each subsegment of pivot segment 460 comprises a quantum device 464-K to mediate coupling operations between qubits as described above. In some embodiments of the present invention, each subsegment of pivot segment 460 is in electrical communication with a controllable coupling mechanism 569 to controllably couple the subsegment to at least one bus segment such that each subsegment is capable of coupling to different bus segments.

In accordance with the present invention, a coupling operation can be performed between any first and second qubit in bus architecture 500 of FIG. 5B by sequencing a series of steps passing through the appropriate pivot segments 460. The two-dimensional bus architecture of FIG. 5B can be extended into a third dimension in which there are successive layers of architecture 500, each layer controllably connected to the other by vias extending from positions 502 of architecture 500. In some embodiments, these vias are bordered by controllable coupling mechanisms (not shown) so that individual layers 500 can be controllably coupled to each other. As in the case of architecture 500 of FIG. 5A, in FIG. 5B there is no requirement for any via, and when vias are present in order to couple one or more two-dimensional layers, such vias can be placed in each row 350, on a portion (some) of the rows 350, or on a single row 350. In this way, any qubit in a three-dimensional qubit array can be coupled with any other qubit in the three dimensional qubit array.

5.3 Tree Architectures

As indicated in the background section, scalability is an issue in the development of useful quantum computers. As the number of qubits scale, so does the complexity of the system. In linear bus type architectures like those shown in FIG. 4, the qubits are arranged in a line and are coupled either to nearest neighbors or to a common coupling bus. In the case of nearest neighbor coupling, a swap between the end qubits of an N qubit linear array takes N swap operations. In the case of bus coupling as in FIG. 4 with N buses 350, a swap operation between a qubit in the first bus and another qubit in the $N^{th}$ bus takes N coupling operations. In addition, the capacitance of the bus increases with the number of qubits coupled to it, thereby limiting the ability of the bus to support quantum calculations.

In the case of two-dimensional qubit or three-dimensional lattices like those shown in FIG. 5A and FIG. 5B, in the worst case, coupling between two qubits takes $\sqrt{N}$ operations within a given two-dimensional layer. Thus, the two-dimensional and three-dimensional qubit lattices of the present invention present a significant advancement over linear bus architectures.

Figure 9A:
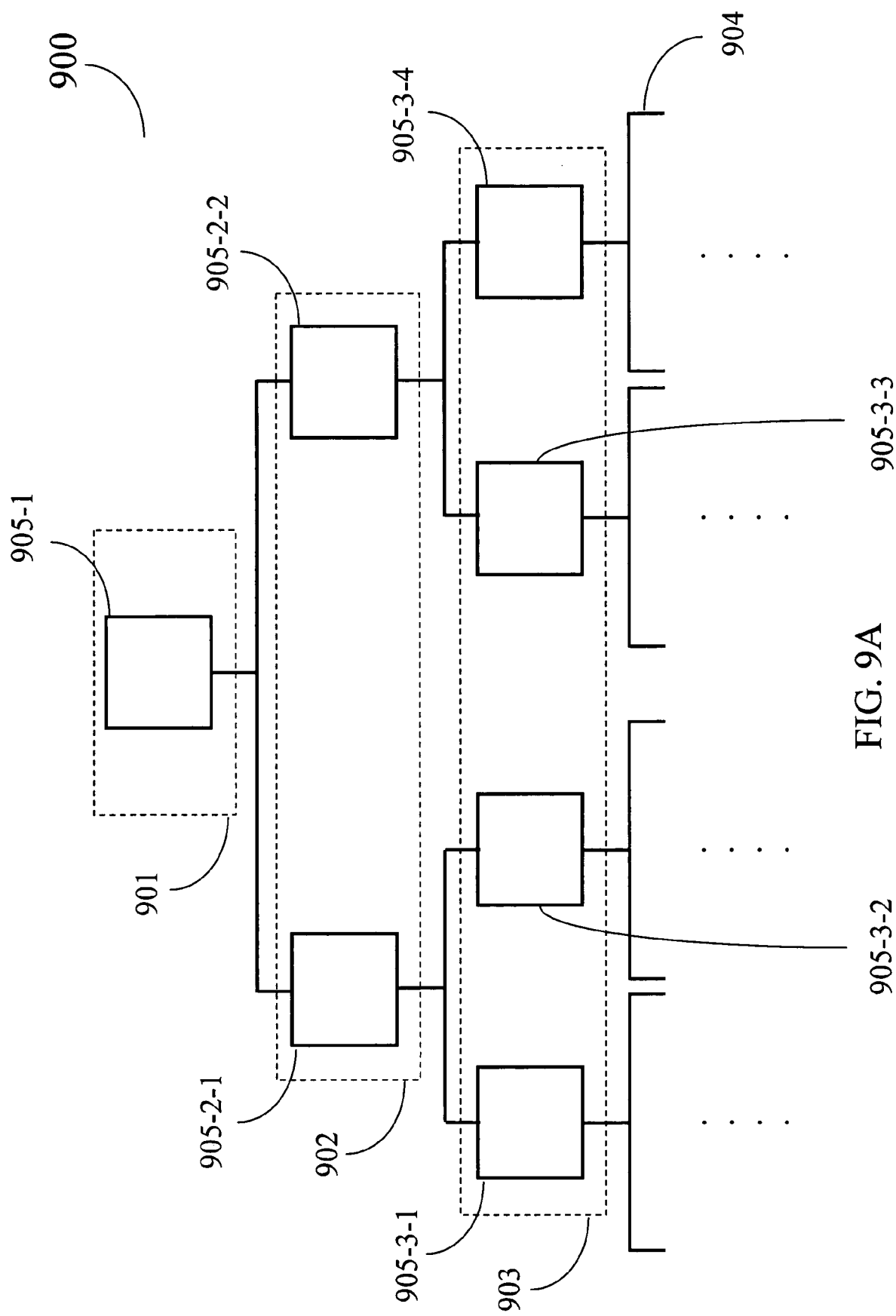
FIG. 9A illustrates an embodiment of a qubit tree architecture in accordance with one embodiment of the present invention

In an embodiment of the present invention, the qubits and coupling systems are arranged as a tree, such as tree 900 that is illustrated in FIG. 9A. The root of tree 900, node 905-1, and all subsequent nodes 905-2, 905-3, etc., branch off into two or more nodes. Two-node branching, where each parent node has two daughter nodes, is a preferred tree embodiment in accordance with the present invention, since such an arrangement minimizes capacitance of the bus lines between each of the nodes. In other embodiments, each parent node can have more than two daughter nodes attached to it. In some embodiments, each parent node has k daughter nodes, where k is an integer in the set of 3 to 10, inclusive. In some embodiments, each parent node has the same or a different number of daughter nodes. Each parent node need not have the same number of daughter nodes. In one embodiment, the root 901 level of tree 900 is a charge coupling system, like the resonant controlled qubit system of FIG. 1, for example. The next level, 902, contains nodes 905-2, which are qubits, and level 903 contains nodes 905-3 which are coupling systems. Levels of qubits and coupling systems continue to alternate in this fashion throughout the remaining lower levels 904 of tree 900 in this particular embodiment. However the root should be a coupling system while the lowest level of the tree should contain qubits. In some embodiments each tree contains a minimum of three levels up to a maximum of five or six levels.

Figure 9B:
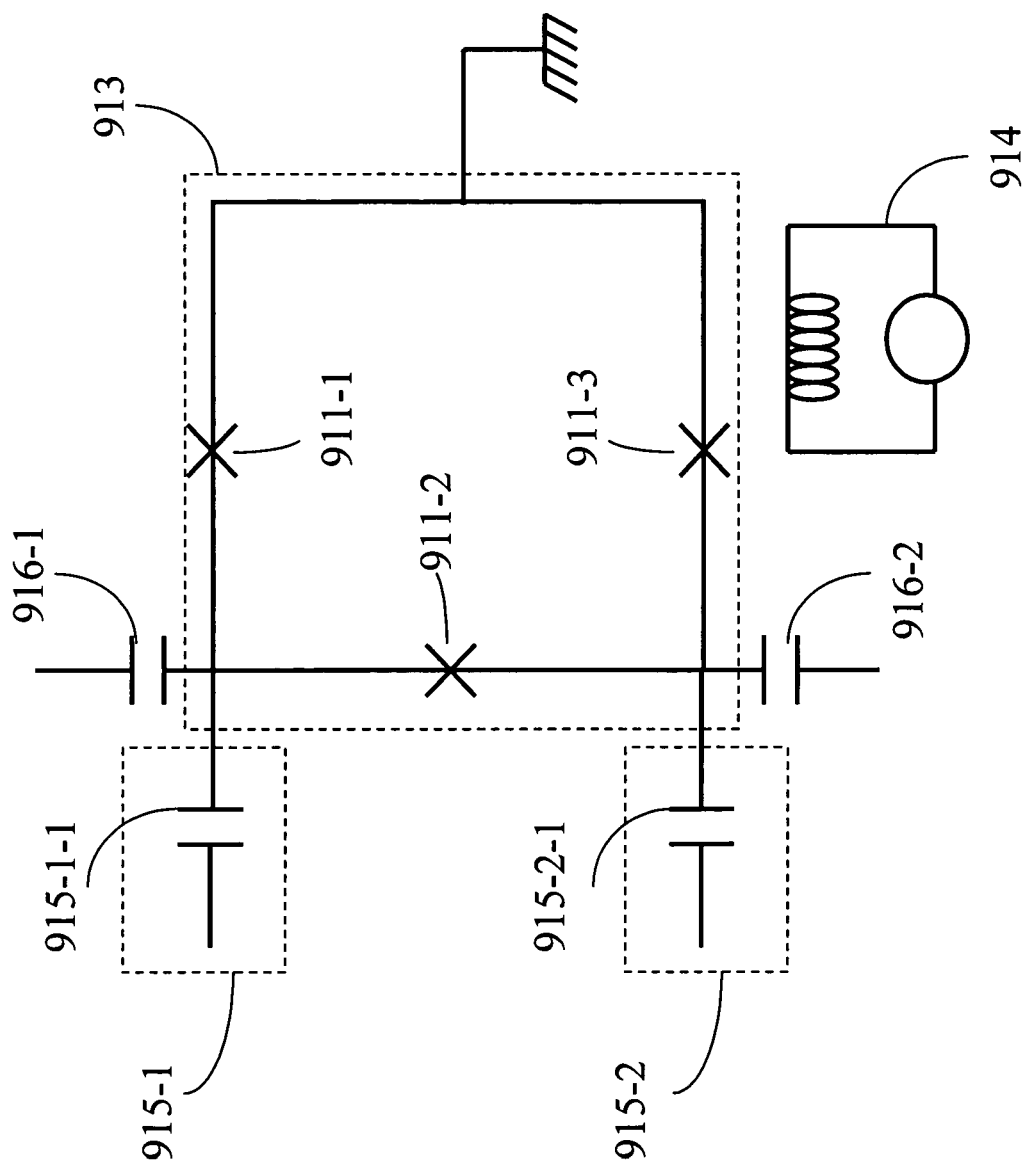
FIG. 9B illustrates an embodiment of the phase-charge qubit.

In other embodiments of tree 900, nodes 905 in two or more adjacent levels (e.g., levels 902 and 903) are qubits. In such embodiments, a VET 320, switch 461/462, or other similar devices are used to controllably isolate each of the nodes 905 in order to turn coupling to such qubits on or off. For example, a VET 320, switch 461/462, or other similar device is placed between 905-2-1 and each of its daughter nodes (e.g., between 905-2-1 and 905-3-1 as well as between 905-2-1 and 905-3-2). In this way, node 905-3-2 can be controllably decoupled from node 905-2-1 while node 905-3-1 is coupled to node 905-2-1, and node 905-3-1 can be controllably decoupled from node 905-2-1 while node 905-3-2 is coupled to node 905-2-1. In the case where a qubit has more than one coupling line and the coupling is controlled by the qubit itself, the device is not needed. An example of this is the phase-charge qubit (PCQ). Referring to FIG. 9B, the phase-charge qubit has two coupling capacitors, 916-1 and 916-2, each of which can be coupled to a coupling capacitor 916 on another phase-charge qubit. The phase-charge qubit also has the ability to completely decouple itself from other qubits by tuning a gate voltage through mechanisms 915. Therefore, an additional controllable coupling device such as a VET 320, switch 461/462, or other similar device is not needed to couple a phase-charge qubit to two other phase charge qubits. In order for the phase-charge qubit to couple to more than two daughter qubits, controllable coupling devices can be used.

FIG. 9B shows an embodiment of a phase-charge qubit 913. Quantum operations are done in the phase regime, while initialization, readout, and coupling is done in the charge regime. Qubit 913 is a superconducting loop interrupted by three Josephson junctions 911-1 to 911-3. In some embodiments of the present invention the Josephson energy for junctions 911 is 0.22 meV. In some embodiments of the present invention the Josephson energy for junctions 911 is between 0.22 meV and 0.5 meV, and in some embodiments it is less than 0.22 meV. The three junctions 911 define three superconducting islands. One island is grounded, while the other two are capacitively coupled to mechanisms 915. In some embodiments, capacitors 915-1-1 and 915-2-1 each have a capacitance of about 1 attofarad. In some embodiments, capacitors 915-1-1 and 915-2-1 each independently have a capacitance between 1 zF and 1 pF. Mechanisms 915 are connected to a gate voltage to control coupling to other qubits via coupling capacitors 916. In some embodiments, each coupling capacitor 916 has a capacitance of about 1 attofarad. In some embodiments, each coupling capacitor 916 has a capacitance between 1 zF and 1 pF. In addition, one or more mechanisms 915 can initialize qubit 913 using a gate voltage. In some embodiments this gate voltage is between 1 pV and 1 V. One of mechanisms 915 can also comprise a measurement device coupled to qubit 913. Such a measurement device measures the charge of the island to which it is coupled, and embodiments can include electrometers like the rf-SET. Mechanism 914 is used to inductively bias the flux of the qubit. In some embodiments, the mutual inductance of qubit 913 and mechanism 914 is between 0.1 pH and 100 pH.

In another embodiment of the phase-charge qubit, the superconducting loop is interrupted by four Josephson junctions, thereby forming four islands. One island is grounded, while another island is capacitively coupled to a measurement device. The remaining two islands are capacitively coupled to gate voltages that can control coupling and/or initialize the system. Those two islands will also be in electrical communication with capacitors, thereby allowing the two islands to be connected and coupled to other qubits. Such capacitors can have a capacitance in the range of 1 zF to 1 pF.

Figure 9C:
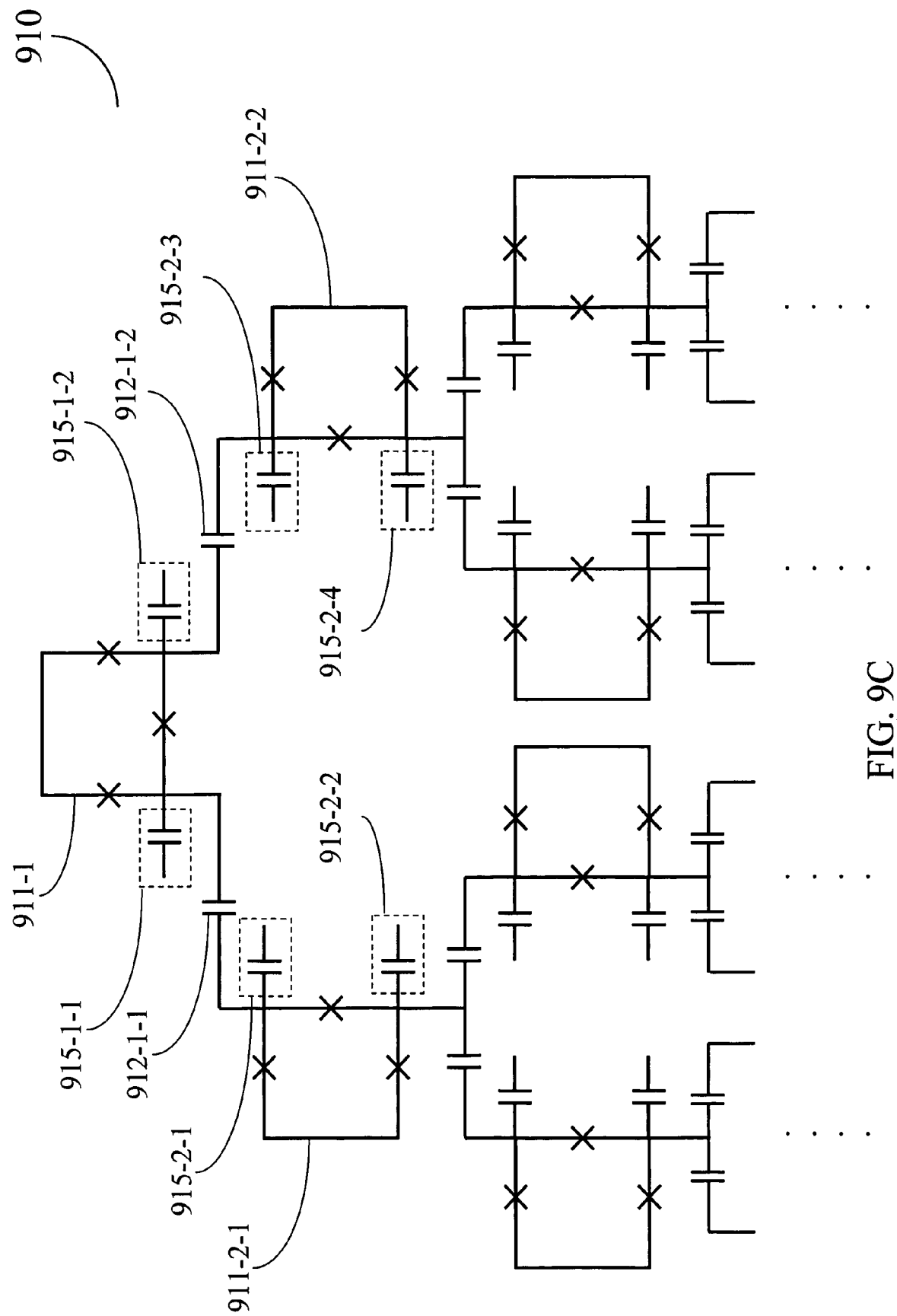
FIG. 9C illustrates an embodiment of a qubit tree architecture in accordance with another embodiment of the present invention Like reference numerals refer to corresponding parts throughout the several views of the drawings.

FIG. 9C shows an embodiment of a tree architecture 910 using qubits 913 of FIG. 9B. Qubits 913 are not drawn out fully in FIG. 9C, but each is a qubit 913 of FIG. 9B described above. Root qubit 911-1 is connected to two qubits 911-2-1 and 911-2-2 via coupling capacitors 912. In some embodiments coupling capacitors 912 are between 1 zf and 1 pF. Capacitors 912 can be fixed or variable in value. Each such branching qubit is then connected to two more qubits, and so on, in order to form tree 910 of FIG. 9C.

To couple two qubits that are directly connected in the tree, the appropriate coupling voltages are tuned through mechanisms 915 for a period of time while all neighboring coupling voltages remain at zero. In some embodiments, the period of time is between one picosecond and one millisecond. To couple two qubits that are not directly connected, a coupling path is traced between the two qubits using other qubits. For instance, to couple qubits 911-2-1 and 911-2-2 in FIG. 9C, both can be coupled to qubit 911-1.

Each bus segment in a tree can have a small number of qubits connected to it (between 2 and 10) and thus the overall capacitance of the system remains low. Due to the tree-branching nature of the architectures shown in FIG. 9A and FIG. 9C, swapping two qubits takes log(N) coupling operations in the worst case. In some embodiments, a tree architecture qubit circuit is implemented in a structure fabricated using niobium or aluminum superconducting material using known microfabrication techniques. Referring to FIGS. 9A and 9C, in some embodiments control wires (buses) are routed on layers above the circuit, and are connected to nodes 905 through vias, which pass vertically through the layers in the fabricated structure.

5.4 Qubits that Can Be Coupled Using the Inventive Architecture

Examples of superconducting qubits 110, 360, 464, 464-K, 610, and/or 905 useful in the present invention include CBJJ qubits, charge qubits, phase-charge qubits, and charge-phase qubits (also known as quantronium qubits). Quantronium and phase-charge qubits are respectively described in U.S. patent application Ser. No. 10/244,634, filed Sep. 16, 2002, entitled "Superconducting quantum-bit device based on Josephson junctions"; and U.S. patent application Ser. No. 10/934,049, Sep. 3, 2004, entitled "Superconducting Phase-Charge Qubits," each of which is hereby incorporated by reference in its entirety. This section provides a description of qubits and then provides more details of exemplary qubits that can be used in accordance with the present invention.

5.4.1 Qubit Properties

A quantum bit or "qubit" 110, 360, 464, 464-K, 610, and/or 905 is the building block of a quantum computer in the same way that a conventional binary bit is a building block of a classical computer. A qubit is a quantum bit, the counterpart in quantum computing to the binary digit or bit of classical computing. Just as a bit is the basic unit of information in a classical computer, a qubit basis state is the basic unit of information in a quantum computer. A qubit is conventionally a system having many discrete energy states, the two lowest of which are used for normal operation of the qubit. The energy eigenstates of a qubit are generally referred to as the basis states of the qubit. The logical basis states of a qubit are termed the $|0\rangle$ and $|1\rangle$ basis states representing the ground and first-excited energy states of the qubit.

A qubit can be in any superposition of its basis states, making it fundamentally different from a bit in an ordinary digital computer. A superposition of basis states arises in a qubit when there is a non-zero probability that the system occupies more than one of the basis states at a given time. Qualitatively, a superposition of basis states means that the qubit can be in both basis states $|0\rangle$ and $|1\rangle$ at the same time. Mathematically, a superposition of basis states means that the overall state of the qubit, which is denoted $|\psi\rangle$, has the form $$|\psi\rangle = a|0\rangle + b|1\rangle \qquad (2)$$

where a and b are probability amplitudes respectively corresponding to probabilities $|a|^2$ of being in the $|0\rangle$ basis state and $|b|^2$ of being in the $|1\rangle$ state. The relationship $$|a|^2 + |b|^2 = 1 \qquad (3)$$

is satisfied by a qubit. The probability amplitudes a and b each have real and imaginary components, which allows the phase of the qubit to be modeled. The quantum nature of a qubit is largely derived from its ability to exist in a superposition of basis states.

To complete a computation using a qubit, the state of the qubit is measured (e.g., read out). When the state of the qubit is measured, the quantum nature of the qubit is temporarily lost and the superposition of basis states collapses to either the $|0\rangle$ or $|1\rangle$ basis state, thus regaining its similarity to a conventional bit. The actual state of the qubit after it has collapsed depends on the probability amplitudes a and b immediately prior to the readout operation.

A survey of the current physical systems from which qubits can be formed is Braunstein and Lo (eds.), 2001, *Scalable Quantum Computers*, Wiley-VCH Verlag GmbH, Berlin, which is hereby incorporated by reference in its entirety. Of the various physical systems surveyed, the systems that appear to be most suited for scaling (e.g., combined in such a manner that they interact with each other) are those physical systems that include superconducting structures such as superconducting qubits.

5.4.2 Superconducting Qubits

One class of qubits is superconducting qubits. Superconducting qubits generally have properties that fall into two categories; phase qubits and charge qubits. Phase qubits are those that store and manipulate information in the phase states of the device. In other words, phase qubits use phase as the information-bearing degree of freedom. Charge qubits store and manipulate information in the charge states of the device. In other words, charge qubits use charge as the information-bearing degree of freedom. When superconducting materials are cooled below a certain critical temperature, the free electrons condense and pair off with other electrons to form Cooper pairs. The collection of Cooper pairs in the material form a single condensate with a phase. Cooper pairs become the elementary charge carriers and each Cooper pair has a phase that is defined by the overall condensate. The division of superconducting qubits into two classes is outlined in Makhlin et al., 2001, "Quantum-State Engineering with Josephson-Junction Devices," Rev. Mod. Phys. 73, pp. 357-401, which is hereby incorporated by reference in its entirety.

Phase and charge are conjugate quantum variables in superconductors at energy scales where quantum effects dominate. Phase qubits have well-defined phase states for storing quantum information, and charge qubits have well-defined charge states for storing quantum information.

Experimental realization of superconducting devices as qubits was made by Nakamura et al., 1999, Nature 398, pp. 786-788, which is hereby incorporated by reference. Nakamura et al. developed a charge qubit that demonstrates the basic operational requirements for a qubit, but with poor (short) decoherence times and stringent control parameters.

Superconducting qubits have two modes of operation related to localization of the states in which information is stored. When the qubit is initialized or measured, the information is classical, 0 or 1, and the states representing that classical information must also be classical in order to provide the most reliable state preparation. Some qubits, however, are not initialized in a classical state, but in a quantum superposition of states. Thus, a first mode of operation of a qubit is to permit state preparation and measurement of classical information. A second mode of operation occurs during quantum computation, where the information states of the device become dominated by quantum effects such that the qubit can evolve controllably as a coherent superposition of those states and, in some instances, become coupled and/or entangled with other qubits in the quantum computer.

Charge Qubit

A charge qubit comprises a Cooper pair box (CPB) isolated by one or two Josephson junctions, and at least two capacitive gates, such that a voltage can be applied to the CPB and such that the charge of the CPB is measurable. The state of the charge qubit is based on the number of Cooper pairs in the CPB. The basis states |0⟩ and |1⟩ are typically respectively represented by n and n+1 Cooper pairs. Work has demonstrated that it is possible to achieve ninety percent efficiency in detection of the state of the charge qubit. Charge qubits can be coupled together through a capacitance. See e.g., Pashkin et al., 2003, Nature 421, pp. 823-826, which is hereby incorporated by reference in its entirety. Furthermore, simple quantum operations have been performed between two charge qubits that share a capacitive coupling. See e.g., Yamamoto et al., 2003, Nature, 425, pp. 941-944, which is hereby incorporated by reference in its entirety.

Phase Qubit

The current biased Josephson Junction (CBJJ) qubit is an example of a phase qubit. See, e.g., Martinis et al., "Rabi oscillations in a large Josephson junction qubit," preprint presented at the American Physical Society (APS) 2002 Annual Meeting, held Jul. 27-31, 2002; and Han et al., 2001, Science 293, pp. 1457-1459, each of which is hereby incorporated by reference in its entirety. Some CBJJ qubits have dimensions of about 10 microns. Under the influence of a bias current that approaches the critical current of the junction, the potential energy of the CBJJ qubit forms a tilted washboard potential, having periodic minima with respect to the phase difference across the junction. The basis states |0⟩ and |1⟩ of the CBJJ are typically the ground state and first excited energy levels in the potential minima. In order to perform quantum computations, the basis states of the CBJJ are allowed to evolve in accordance with quantum mechanical principles. The state of the CBJJ can be a superposition of these states and controlled quantum evolution of the CBJJ can be achieved by application of microwave frequency waves, current biasing, and entanglement of the quantum state of the CBJJ with the quantum state of other qubits. Two or more CBJJs can be coupled capacitively either directly or through a bus configuration. See e.g., Blais et al., as well as Berkley et al., 2003, Science 300, pp. 1548-1550, each of which is hereby incorporated by reference in its entirety.

The observation of a state-dependent voltage across the CBJJ is a central aspect to reading out the state of a CBJJ. In some embodiments, this state-dependent voltage ranges between 1 pV and 1 V. Typically, readout of the CBJJ is realized by applying a microwave frequency wave, such that the CBJJ is conditionally excited to a higher energy level. The frequency of this microwave frequency wave corresponds to the energy differential between the higher energy level of the CBJJ and the lower energy level of the CBJJ that are used in a quantum computation. The higher energy level has a higher probability of escaping from the potential well, resulting in a time-varying phase difference across the Josephson junction and a corresponding state-dependent voltage drop across the CBJJ. A detrimental consequence of measurement of this voltage is that the CBJJ reaches an excited state resulting in the generation of thermal energy. Thus, the CBJJ qubit must be allowed some relaxation time before being re-initialized in order to allow the heat to dissipate.

Hybrid Qubits

Charge qubit with phase control (quantronium). An exemplary hybrid qubit operates using both phase and charge to store, manipulate, and readout information. This qubit, variously called the Saclay qubit or quantronium, has a structure similar to a conventional charge qubit modified to be read out in the phase regime. The quantronium qubit has one degree of freedom in the phase basis and another degree of freedom in the charge basis. Readout of the quantronium involves measuring the phase of the hybrid qubit, but computation can involve interaction with either the charge or phase degrees of freedom. See, for example, U.S. Pat. No. 6,838,694 B2, entitled "Superconducting quantum-bit device based on Josephson junctions," as well as Vion et al., cited herein above, each of which is hereby incorporated by reference in its entirety. The quantronium comprises a small superconducting island, playing the role of the Cooper pair box in the charge qubit, isolated by two Josephson junctions through which a bias current can interact with the phase of the qubit, and gate voltages, through which the charge of the qubit can be controlled or detected.

Measurement of the quantronium, see e.g. Vion et al., comprises placing a large Josephson junction in a loop with the island and driving a current across the large Josephson junction. Under the influence of a bias current, the qubit island develops a state-dependent current that increases or decreases the bias current across the large Josephson junction. Thus, depending on the state of the qubit, the large Josephson junction will enter the voltage state and the voltage can be detected in order to confirm the state of the qubit. The quantronium can be capacitively coupled to other qubits either directly or by a bus mechanism (see Blais et al.).

Phase-charge qubit. Another type of hybrid superconducting qubit exploiting charge control is the phase-charge qubit. The phase-charge qubit is presented in Amin et al. The structure of the phase-charge qubit is similar to that of a superconducting phase qubit including a superconducting loop and a plurality of Josephson junctions forming a plurality of islands within the superconducting loop. The qubit further includes gates for controlling the qubit state. The phase-charge qubit can be controllably tuned to the charge basis, where the charge degree of freedom depends on the quantum information stored in the qubit and can be manipulated or detected.

Measurement of the phase-charge qubit comprises applying a gate voltage (e.g., 1 pV to 1 V) to one of the islands in the plurality of islands and setting the gate voltage to a predetermined value. The gate voltage is different depending on the exact qubit being used, but it is determined based on what voltage is necessary to achieve a certain charge on an island that is being coupled to a readout device. In some embodiments this voltage is such that the gate charge on a first island coupled to the readout device is $n=\frac{1}{4}$ and the voltage on a second island is such that the gate charge on the second island is $n=0$. Measurement of the phase-charge qubit comprises applying these voltages and detecting a charge on the first island. Capacitive coupling between phase-charge qubits can be achieved by applying a gate voltage to make one or more islands of each phase-charge qubit sensitive to charge. In some instances, this comprises applying a voltage such that the gate charge on an island is $n=\frac{1}{4}$ and $n=0$ on another island. Once tuned such that the resulting charges are state-dependent, the qubits can interact capacitively with each other, hence entangling the states of the qubits. Tuning the phase-charge qubit, as described, is a quantum coherent operation.

5.5 Cited References

All references cited herein are incorporated herein by reference in their entirety and for all purposes to the same extent as if each individual publication, patent, patent application, or patent publication was specifically and individually indicated to be incorporated by reference in its entirety for all purposes.

5.6 Conclusion

When introducing elements of the present invention or the embodiment(s) thereof, the articles "a," "an," "the," and "said" are intended to mean that there are one or more of the elements. The terms "comprising," "including," and "having" are intended to be inclusive and to mean that there may be additional elements other than the listed elements. Moreover, the term "about" has been used to describe specific parameters. In many instances, specific ranges for the term "about" have been provided. However, when no specific range has been provided for a particular usage of the term "about" herein, than either of two definitions can be used. In the first definition, the term "about" is the typical range of values about the stated value that one of skill in the art would expect for the physical parameter represented by the stated value. For example, a typical range of values about a specified value can be defined as the typical error that would be expected in measuring or observing the physical parameter that the specified value represents. In the second definition of about, the term "about" means the stated value ±0.10 of the stated value.

While the present invention has been described with reference to specific embodiments, the description is illustrative of the invention and is not to be construed as limiting the invention. Various modifications may occur to those skilled in the art without departing from the true spirit and scope of the invention as defined by the appended claims. This patent specification concludes with the appended claims.

We claim:

1. A quantum processing apparatus comprising:
   a superconducting qubit;
   a superconducting bus;
   a quantum device coupled to the superconducting bus; and
   a controllable coupling mechanism that controllably couples the superconducting bus to the superconducting qubit, the controllable coupling mechanism capable of being in any one of a plurality of states at any given time, said plurality of states comprising:
   a first state in which the superconducting bus and the superconducting qubit are capacitively coupled, thereby permitting a coupling to be performed on the superconducting qubit and the superconducting bus; and
   a second state in which the superconducting bus and the superconducting qubit are capacitively uncoupled.

2. The quantum processing apparatus of claim 1 wherein the superconducting qubit is a phase qubit, a charge qubit, a phase-charge qubit, or a quantronium qubit.

3. The quantum processing apparatus of claim 1 wherein said quantum device is a CBJJ qubit, a phase-charge qubit, a quantronium qubit, or a charge qubit.

4. The quantum processing apparatus of claim 1, wherein said controllable coupling mechanism comprises:
   a superconducting island;
   a Josephson junction including a first terminal and a second terminal wherein said first terminal is coupled to the superconducting island;
   a gate voltage source in electrical communication with said second terminal of said Josephson junction and in electrical communication with ground;
   a first capacitor capacitively coupling the superconducting island to the superconducting qubit; and
   a second capacitor capacitively coupling the superconducting island to the superconducting bus.

5. The quantum processing apparatus of claim 1 wherein said superconducting qubit is in a plurality of superconducting qubits and said controllable coupling mechanism is in a plurality of controllable coupling mechanisms, wherein each respective superconducting qubit in all or a portion of the plurality of superconducting qubits is controllably coupled to the superconducting bus by a respective corresponding controllable coupling mechanism in the plurality of controllable coupling mechanisms; and
   each respective controllable coupling mechanism in the plurality of controllable coupling mechanisms is in any one of a plurality of states at a given time, said plurality of states comprising:
   a first state in which the superconducting bus and the superconducting qubit corresponding to the respective controllable coupling mechanism are capacitively coupled, thereby permitting a quantum operation to be performed on the superconducting qubit corresponding to the respective controllable coupling mechanism and said quantum device; and
   a second state in which the superconducting bus and the superconducting qubit corresponding to the respective controllable coupling mechanism are capacitively uncoupled.

6. The quantum processing apparatus of claim 5, wherein said portion comprises all the qubits in the plurality of qubits.

7. The quantum processing apparatus of claim 5, wherein each respective superconducting qubit in all or a portion of the plurality of superconducting qubits is independently a phase qubit, a charge qubit, a phase-charge qubit, or a quantronium qubit.

8. A bus architecture for quantum processing, comprising:
   a plurality of bus segments;
   a plurality of qubit sets, each qubit set in the plurality of qubit sets comprising a plurality of qubits;
   a plurality of pivot segments, each pivot segment in the plurality of pivot segments controllably coupling a different first bus segment and second bus segment in the plurality of bus segments to each other; and
   a plurality of controllable coupling mechanisms, each respective controllable coupling mechanism in the plurality of controllable coupling mechanisms controllably coupling a corresponding qubit in a qubit set in the plurality of qubit sets to a bus segment in the plurality of bus segments such that each qubit in each qubit set in said plurality of qubit sets is controllably coupled to at least one bus segment in said plurality of bus segments, wherein each respective controllable coupling mechanism in the plurality of controllable coupling mechanisms comprises:
   a coupled state, wherein a controllable coupling operation between a bus segment in said plurality of bus segments and a qubit corresponding to the respective controllable coupling mechanism is possible, and
   an uncoupled state, wherein the qubit does not capacitively affect the bus segment.

9. The bus architecture of claim 8, wherein a pivot segment in the plurality of pivot segments is in electrical communication with a mechanism for controlling a characteristic of the pivot segment, and wherein the pivot segment comprises:

one or more controllable pivot segment coupling mechanisms, each pivot segment controllable coupling mechanism in the one or more pivot segment controllable coupling mechanisms couples the pivot segment to a corresponding bus segment in the plurality of bus segments and a pivot segment controllable coupling mechanism in the one or more pivot segment controllable coupling mechanisms is characterized by a first coupled state, wherein a controllable coupling operation between the bus segment corresponding to the pivot segment controllable coupling mechanism and the pivot segment is possible, and an uncoupled state, wherein the pivot segment does not capacitively affect the bus segment corresponding to the pivot segment controllable coupling mechanism.

10. The bus architecture of claim 8, wherein a pivot segment in the plurality of pivot segments is configured to pass quantum information between a first bus segment and a second bus segment in the plurality of bus segments.

11. The bus architecture of claim 9, wherein the mechanism for controlling said characteristic of the pivot segment comprises a quantum device.

12. The bus architecture of claim 11, wherein the quantum device is a phase qubit, a charge qubit, a phase-charge qubit, or a quantronium qubit.

13. The bus architecture of claim 9, wherein a pivot segment in the plurality of pivot segments further comprises:

a plurality of subsegments, each subsegment in the plurality of subsegments controllably connected to another subsegment in the plurality of subsegments by a controllable coupling mechanism and wherein two or more subsegments in the plurality of subsegments are controllably connected to different bus segments in the plurality of bus segments.

14. The bus architecture of claim 13, wherein each respective subsegment in the plurality of subsegments is in electrical communication with a different mechanism for controlling a characteristic of the respective subsegment.

\* \* \* \* \*

UNITED STATES PATENT AND TRADEMARK OFFICE
CERTIFICATE OF CORRECTION

| | | |
|---|---|---|
| PATENT NO. | : 7,613,765 B1 | Page 1 of 1 |
| APPLICATION NO. | : 11/089653 | |
| DATED | : November 3, 2009 | |
| INVENTOR(S) | : Hilton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Nineteenth Day of October, 2010

David J. Kappos
*Director of the United States Patent and Trademark Office*